US011951048B2

(12) United States Patent
King et al.

(10) Patent No.: US 11,951,048 B2
(45) Date of Patent: Apr. 9, 2024

(54) SOME FUNCTIONAL PARTS OF OPERATING TABLE AND OPERATING TABLE

(71) Applicant: TRUMPF MEDIZIN SYSTEME GMBH + CO. KG, Saalfeld (DE)

(72) Inventors: Kwang-un Clarence King, Shanghai (CN); Qiang Hao, Shanghai (CN); Hao Shi, Taicang (CN); Jian Wang, Taicang (CN); Debao Ma, Kunshan (CN); Wei Ma, Taicang (CN); Jipeng Wang, Suzhou (CN); Jian Yang, Taicang (CN); Boon Khai Ang, Singapore (CN); Min Htun Aye, Singapore (CN); Arnd Kuchenbecker, Saalfeld (DE); Falk Georgi, Saalfelder Höhe (DE)

(73) Assignee: TRUMPF MEDIZIN SYSTEME GMBH + CO. KG, Saalfeld (DE)

( * ) Notice: Subject to any disclaimer, the term of this patent is extended or adjusted under 35 U.S.C. 154(b) by 647 days.

(21) Appl. No.: 17/132,153

(22) Filed: Dec. 23, 2020

(65) Prior Publication Data

US 2021/0106484 A1 Apr. 15, 2021

Related U.S. Application Data

(63) Continuation of application No. 15/809,206, filed on Nov. 10, 2017, now Pat. No. 11,083,658.

(30) Foreign Application Priority Data

Nov. 11, 2016 (CN) ........................ 201621216902.X

(51) Int. Cl.
*A61G 13/06* (2006.01)
*A47C 19/04* (2006.01)
(Continued)

(52) U.S. Cl.
CPC ...... *A61G 13/06* (2013.01); *A47B 2200/0052* (2013.01); *A47C 19/045* (2013.01);
(Continued)

(58) Field of Classification Search
CPC ........ A61G 13/06; A61G 13/02; A61G 7/018; A61G 7/012; A61G 13/0018; A47B 9/20;
(Continued)

(56) References Cited

U.S. PATENT DOCUMENTS 4,101,120 A * 7/1978 Seshima ................ A61G 13/02 5/616
4,254,928 A * 3/1981 Huempfner ............ F16M 11/18 108/147
(Continued)

*Primary Examiner* — Justin C Mikowski
*Assistant Examiner* — Morgan J McClure
(74) *Attorney, Agent, or Firm* — Barnes & Thornburg LLP

(57) ABSTRACT

The present disclosure relates to an operating table, the operating table comprising a table top, a table top support and a column with a column head, wherein the sealing device is bellows assembled below the column head, or an adhesive in a hole and/or window on the holder of the cable, or a sealing gasket between the receiver and the column head, or a shield sealingly attached to the column head below the gear. The present disclosure further relates to control equipment, a lifting device, an intelligent charger, a column guide system for an operating table, as well as an operating table including the same.

19 Claims, 18 Drawing Sheets

(51) Int. Cl.
*A47C 20/04* (2006.01)
*A61G 7/012* (2006.01)
*A61G 7/018* (2006.01)
*A61G 13/00* (2006.01)
*A61G 13/02* (2006.01)

(52) U.S. Cl.
CPC .......... *A47C 20/041* (2013.01); *A47C 20/042* (2013.01); *A61G 7/012* (2013.01); *A61G 7/018* (2013.01); *A61G 13/0018* (2013.01); *A61G 13/02* (2013.01)

(58) Field of Classification Search
CPC .... A47B 2200/0054; A47B 2200/0052; A61B 6/0407; A61B 5/704; A47C 19/045; A47C 20/041; A47C 20/042
See application file for complete search history.

(56) References Cited

U.S. PATENT DOCUMENTS 4,552,403 A * 11/1985 Yindra ................... A61G 13/02 187/209
4,761,000 A * 8/1988 Fisher .................... A61G 13/02 5/601
5,231,741 A * 8/1993 Maguire .............. A61G 17/044 27/12
5,398,356 A * 3/1995 Pfleger ................... A61G 13/02 5/601
5,468,216 A * 11/1995 Johnson ............... A61H 1/0292 601/24
5,528,782 A * 6/1996 Pfeuffer ................. A61G 13/04 5/607
5,722,300 A * 3/1998 Burkhard .................. F16D 3/06 384/42
5,791,233 A * 8/1998 Knapp ...................... B66F 7/04 92/167
5,901,610 A * 5/1999 Schneider ............ A47C 20/041 74/89.41
6,272,853 B1 * 8/2001 Broechmann ........ A47C 19/045 91/169
7,870,624 B1 * 1/2011 Winston ................. A61G 13/06 5/613
10,524,564 B1 * 1/2020 Wu .......................... A47B 9/20
2002/0138903 A1 * 10/2002 Simmons ............... A61G 13/06 5/610
2004/0020316 A1 * 2/2004 Dewert ................ A47C 20/041 74/89.23
2005/0002591 A1 * 1/2005 Buitmann .............. F16M 11/28 384/35
2005/0077852 A1 * 4/2005 Treon ..................... A61G 15/02 318/271
2005/0161648 A1 * 7/2005 Oudelaar .................. B66F 7/18 254/93 R
2009/0320206 A1 * 12/2009 Dyreby ..................... B66F 3/00 254/338
2010/0223728 A1 * 9/2010 Hutchison ................. B66F 3/06 59/84
2011/0083273 A1 * 4/2011 Sharps ............... A61G 13/0054 5/624
2011/0120815 A1 * 5/2011 Frolik ................. B60B 33/0081 188/1.12
2013/0219623 A1 * 8/2013 Jackson ............. A61G 13/0036 5/613
2013/0312181 A1 * 11/2013 Jackson ................. A61G 7/012 5/81.1 RP
2013/0312187 A1 * 11/2013 Jackson ................. A61G 13/04 5/613
2016/0106226 A1 * 4/2016 Yi .......................... A47D 9/012 5/11
2016/0270994 A1 * 9/2016 Staudinger ............. A61G 13/06
2016/0302902 A1 * 10/2016 Wolfsberger .......... A01K 13/00
2016/0331619 A1 * 11/2016 Revenus ................ A61G 13/10
2019/0059572 A1 * 2/2019 Moody .................... B25H 1/10
2020/0253804 A1 * 8/2020 Smith ................ A61G 13/1225
2021/0145163 A1 * 5/2021 Lin .......................... A47B 9/20
2023/0210254 A1 * 7/2023 Lin .......................... A47B 9/20 108/20

* cited by examiner

230

SOME FUNCTIONAL PARTS OF OPERATING TABLE AND OPERATING TABLE

CROSS-REFERENCE TO RELATED APPLICATIONS

This is a continuation application of U.S. patent application Ser. No. 15/809,206, filed Nov. 10, 2017 and titled "SOME FUNCTIONAL PARTS OF OPERATING TABLE AND OPERATING TABLE," which claims priority to U.S. Chinese Patent Application Serial No. 201621216902.X, filed Nov. 11, 2016 and titled "SOME FUNCTIONAL PARTS FOR OPERATING TABLE AND OPERATING TABLE," the text and drawings of which are incorporated herein by reference in their entirety.

BACKGROUND

The present disclosure generally relates to the medical field, and in particular to a sealing device, control equipment, a lifting device, an intelligent charger, and a column guide system for an operating table and the operating table in general.

For large medical equipment such as operating tables, as there are gaps between the components, or there are channels for letting the cables through, or the equipment has openings and the like for the transmission outputs (such as rack-gear), proper sealing devices are required to prevent the undesired objects such as water or particles from intruding the equipment.

An operating table normally comprises a table body for performing the surgery thereon, a plurality of motors for manipulating the table body, and control equipment for operating and controlling the operating table.

An operating table may work in the normal operating mode and an emergency mode, wherein the emergency mode serves as auxiliary control for the operating table when the operating table malfunctions in the normal operating mode. The control equipment for operating and controlling the operating table usually has an assembly for causing the operating table to come into and work at the emergency mode, but this assembly is not very stable so that the operating table can not reliably work in the emergency mode.

A medical operating table normally comprises a stationary bottom column and a top column movable in the vertical direction, and in order to adjust the operating table top up and down so as to adapt for the different surgery applications, the top column is fixedly connected to the operating table top and is movable in the vertical direction by a lifting device. In the prior art lifting device for the operating table, it is usual to use a lifting pipe for moving the top column, wherein the top of the lifting pipe is provided with a groove, and the bridge web fixedly connected to the top column fits into the groove, so that the lifting pipe can drive the top column to rise or fall and simultaneously avoid rotary movement of the lifting pipe. The prior art lifting device has a high manufacturing cost.

The operating table in the prior art is usually equipped with a column guide system to adjust the height of the table top of the operating table. This column guide system comprises a top column and a bottom column. The top column is nested into the bottom column and is slidable over the bottom column. The column guide system must have the sufficient rigidity to bear the corresponding bending moment. If the surgical object has the relatively great weight, such bending moment also will be relatively great and lead to stick-slip phenomenon of the top column relative to the bottom column. This results in that it is difficult to evenly regulate the height of the table top of the operating table. In addition, the relative slip between the top column and the bottom column will lead to the serious wear of the elements, so as to create a gap between the top column and the bottom column. The gap also may be caused by the manufacturing tolerance of the elements and have an adverse effect on guidance of the column guide system when regulating the operating table height, such as lock-in-place. Finally, due to the relatively great coefficient of friction of the sliding surface in the sliding guidance, the relatively great driving force is required for raising the top column, in order to overcome the friction force. The rolling guide system also is known from the prior art, especially a linear guide system. Although the linear guide system has the advantages of minor wear, no stick-slip phenomenon and small coefficient of friction, it can be directly applied to the operating table column, since it is normally suitable for the horizontal position only.

SUMMARY

According to one aspect of the present disclosure, the operating table comprises a table top and a column having a column head, bellows being mounted below the column head, wherein a top surface of the bellows and a bottom surface of the column head are sealingly bonded, whereby the bellows form a sealing device for the column head.

According to another aspect of the present disclosure, the operating table comprises a table top, a table top support, and a column having a column head, wherein the column head is equipped with a holder thereon, the holder is drilled with a hole for letting a cable through and/or a window for receiving a limit switch, so as to hold and guide the cable into the column head and/or bear the limit switch, and the sealing device is an adhesive in the hole and/or the window for sealing the hole and/or the window.

According to a further aspect of the present disclosure, the operating table comprises a table top and a column having a column head, the outer side of the column head being at least regionally covered with a cover that defines a receiving window for accommodating receiver, the receiver being attached to the column head within the receiving window, and a gasket forming the sealing device being arranged between the receiver and the column head, wherein at least one edge of the gasket sealingly abuts against the edge of the cover defining border of the receiving window.

According to a further aspect of the present disclosure, a sealing device for an operating table is provided, the operating table including a table top, a table top support and a column having a column head, the table top support having a rack for driving movement of the table top support, the column head being equipped thereon with a gear engaging with the rack, the sealing device being a shield, the shield being sealingly attached to the column head beneath the gear, so as to seal an opening where the interior space of the column head is located relative to the gear, According to another aspect of the present disclosure, the control equipment for an operating table is characterized by comprising: at least one pair of relays, the respective output terminals of two relays in each pair of relay being receptively connected to both ends of a motor included in the operating table, the respective normally-closed terminals of the two relays being connected to a DC power source; a driver, which is connected between ground and a normally-opened terminal of each relay of the at least one pair of relays so as to work when receiving a drive signal so that the normally-opened terminal of each relay of the at least one pair of relays is connected with the ground; a microcontrol unit, which is used to output the drive signal to the driver in the case of being not disabled and to output a control signal to a control input end of the corresponding relay of the at least one pair of relays when a specified key on keyboard is pressed down; and a control module embodied by hardware for disabling the microcontrol unit when it is detected that the key of the keyboard indicating the emergency mode is pressed down, outputting the drive signal to the driver, and making the control input end of each relay of the at least one pair of relays connected to the corresponding key on the keyboard.

In some embodiments, the control module can be embodied by a complex programmable logic device.

In some embodiments, the control module comprises: a connection control circuit for making the control input end of each relay of the at least one pair of relays connected to the corresponding key on the keyboard upon receiving a connection enable signal; and a detection circuit for outputting the enable signal to the connection control circuit when it is detected that the key of the keyboard indicating the emergency mode is pressed down, outputting a disable signal to the microcontrol unit to disable the microcontrol unit, and outputting the drive signal to the driver.

In some embodiments, the control module further comprises: a connection control circuit for making the control input end of each relay of the at least one pair of relays connected to the corresponding key on the keyboard upon receiving a connection enable signal; a drive signal supply unit for outputting the drive signal to the driver upon receiving an indication signal; and a detection circuit for outputting the enable signal to the connection control circuit when it is detected that the key of the keyboard indicating the emergency mode is pressed down, outputting a disable signal to the microcontrol unit so as to disable the microcontrol unit; and outputting the indication signal to the drive signal supply unit.

In some embodiments, the connection control circuit is an optical isolator.

In some embodiments, the drive signal supply unit is a timer.

In some embodiments, the control equipment further comprises a keyboard.

In some embodiments, the control module comprises pairs of terminals, each pair of terminals comprising an output terminal and an input terminal connected to one key of the keyboard, wherein the control equipment further comprises a plurality of multiplexers, each of the multiplexers comprising at least two input terminals and one output terminal and two and being used for connecting the input terminal of the two input terminals that is inputted with the signal to its output terminal, wherein for each of the plurality of multiplexers, its output terminal is connected to the control input end of one relay of the at least one pair of relays, its input terminal is connected to the microcontrol unit to receive the control signal that is outputted by the microcontrol unit to the control input end of the one relay, and its other input terminal is connected to the output terminal included in one pair of the pairs of terminals, wherein when it is detected that the key of the keyboard indicating the emergency mode is pressed down, the control module connects the input terminal and output terminal included in each pair of the pairs of terminals, so that the control input end of each relay of the at least one pair of relays is connected to the corresponding key of the keyboard.

In some embodiments, the keyboard is embodied by a device that directly outputs key signals, or a device capable of outputting digital signals.

In another aspect, the operating table according to the example of the present disclosure comprises a table body for bearing the patient undergoing the surgery, at least one motor for manipulating the table body, and the above control equipment.

It can be seen from the above description that the examples of the present disclosure just make use of the hardware for embodying the control module in the control equipment of the operating table that enables the operating table to come into and work at the emergency mode. The solutions defined in the examples of the present disclosure can ensure that the operating table reliably works in the emergency mode compared with the prior art, since the hardware is relatively stable.

According to yet another aspect of the present disclosure, a lifting device for use in an operating table is provided, which comprises: a stationary bottom column, a top column movable in the vertical direction, a lifting mechanism for moving the top column in the vertical direction, wherein the lifting mechanism comprises a screw-and-nut transmission, the screw-and-nut transmission has a lead screw that is in operative connection with a drive motor, and a screw nut that is accommodated within and is fixedly connected to a nut housing, the screw-and-nut transmission being configured to convert a rotary motion of the lead screw into a translational motion of the nut housing in the vertical direction, wherein positioning and fastening of the top column and the nut housing are achieved by a lifting fork.

In one embodiment, the lifting fork has a substantially U-shaped configuration.

In one embodiment, the nut housing on both sides has a first groove and a second groove that extend in a direction perpendicular to the lead screw respectively, and the lifting fork has a base, a first arm for being fit inserted into the first groove, and a second arm for being fit inserted into the second groove.

In one embodiment, the inner side of the first arm forms a first positioning surface and abuts against a first abutment surface of the first groove in the well-assembled state, the inner side of the second arm forms a second positioning surface and abuts against a second abutment surface of the second groove in the well-assembled state, and the inner side of the base forms a third positioning surface and abuts against a third abutment surface at the front side of the nut housing in the well-assembled state.

In one embodiment, notches are respectively disposed at two corners of the inner side surface of the lifting fork, so that the first positioning surface and the third positioning surface are spaced apart, and the second positioning surface and the third positioning surface are spaced apart.

In one embodiment, the nut housing at the front side is provided with an adjustment bolt borehole, adjustment bolt in the well-assembled state being screwed into the adjustment bolt borehole in the nut housing through the top column so as to pretension the top column and the nut housing with a predetermined pretensioning force.

In one embodiment, in the well-assembled state, the first arm and the second arm of the lifting fork extend beyond the first groove and the second groove and are fitted in corresponding openings in the back side of the top column.

According to the present disclosure, the manufacturing cost of the lifting device for the operating table can be reduced by cooperation of the lifting fork and the nut housing. The lifting device in accordance with the present disclosure has the reliable running performance and long service life. The lifting device in accordance with the present disclosure also can be easily assembled.

In accordance with the present disclosure, a charger is provided, which comprises a charging control circuit, characterized in that the charging control circuit further comprises a PWM circuit for controlling charge current for charging the battery to be charged by outputting a control signal of predetermined duty cycle and frequencies.

In accordance with one example, the charging control circuit further includes a current/voltage detection circuit for detecting the state of the battery to be charged, and a microcontroller for controlling the duty cycle and frequencies of the control signal outputted from the PWM circuit according to the detected battery state.

In accordance with one example, the charging control circuit further includes a temperature sensor for detecting working temperature of the battery to be charged, wherein the microcontroller controls the duty cycle and frequencies of the control signal outputted from the PWM circuit according to the detected temperature.

In accordance with one example, there are groups of the control signals, wherein the duty cycles and frequencies of the groups of the control signals each are different from each other, so as to control the magnitude and duration of the different charge currents.

According to the present disclosure, a column guide system, which is used for bearing a table top of the operating table, the column guide system comprising a bottom column and a top column, the bottom column having at least two guide rails, the guide rails being spaced apart from each other, the top column being guided in the vertical direction by the guide rails, wherein the guide rails are arranged to make the plane formed by at least two guide rails of the guide rail parallel to the longitudinal axis of the operating table top.

According to one embodiment of the present disclosure, the top column in its lower region has at least two guide sliders and a spacing adjustment compensation device, the guide sliders can be fitted onto the guide rails in a positive-locking manner, and the spacing adjustment compensation device is used to adjust the spacing between the guide sliders so as to enable the guide sliders to move over the whole height of the guide rails.

According to one embodiment of the present disclosure, the spacing adjustment compensation device at least includes a first slot and a second slot and spacing adjustment compensation elements, the guide sliders are respectively secured within the corresponding slots, and the spacing adjustment compensation elements are configured to adjust the spacing between the side of the guide sliders and the sidewall of the slots.

According to one embodiment of the present disclosure, one side of the guide slider within the first slot abuts against one sidewall of the first slot, and the other side is to adjust the spacing between the said other side and the other sidewall of the first slot by the spacing adjustment compensation elements. In the disclosed embodiment, the spacing adjustment compensation element is a fastening screw or wedge block.

According to one embodiment of the present disclosure, the two sides of the guide slider in the second slot both regulate the spacing between the said sides and the corresponding sidewalls of the second slot by the spacing adjustment compensation elements. In the disclosed embodiment, the spacing adjustment compensation elements are wedge block.

The present disclosure also relates to an operating table, which has the above-mentioned column guide system.

Compared with the prior art, the column guide system according to the present disclosure has the greater rigidity and compacter structure, and especially the spacing created by the manufacturing tolerance can be compensated for by the positive-locking fit between the components, so as to prevent the operating table against swing due to the gap when the surgical object has the heavy weight.

BRIEF DESCRIPTIONS OF THE DRAWINGS

The present disclosure and its advantages can be further understood by reading the detailed description for the disclosed embodiments with reference to the drawings. In the drawings.

DETAILED DESCRIPTION OF THE DRAWINGS

Figure 1:
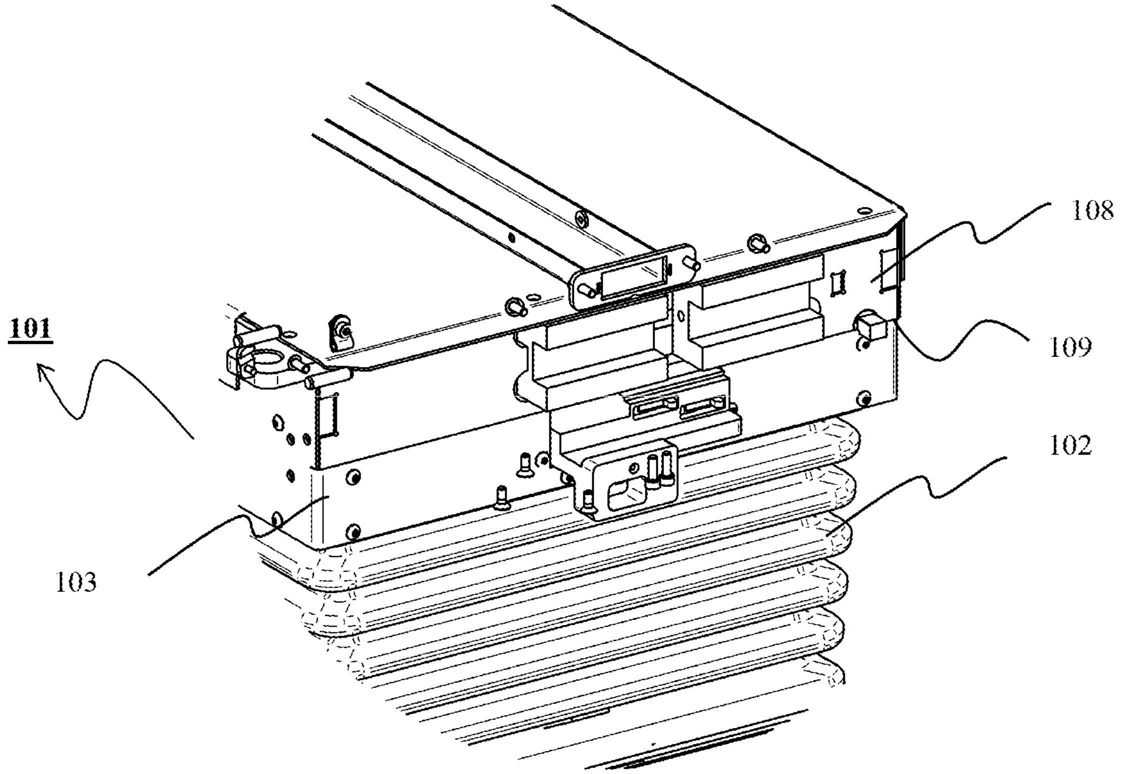
FIG. 1 is a partial side stereoscopic view of an operating table according to one example of the present disclosure.
Figure 2:
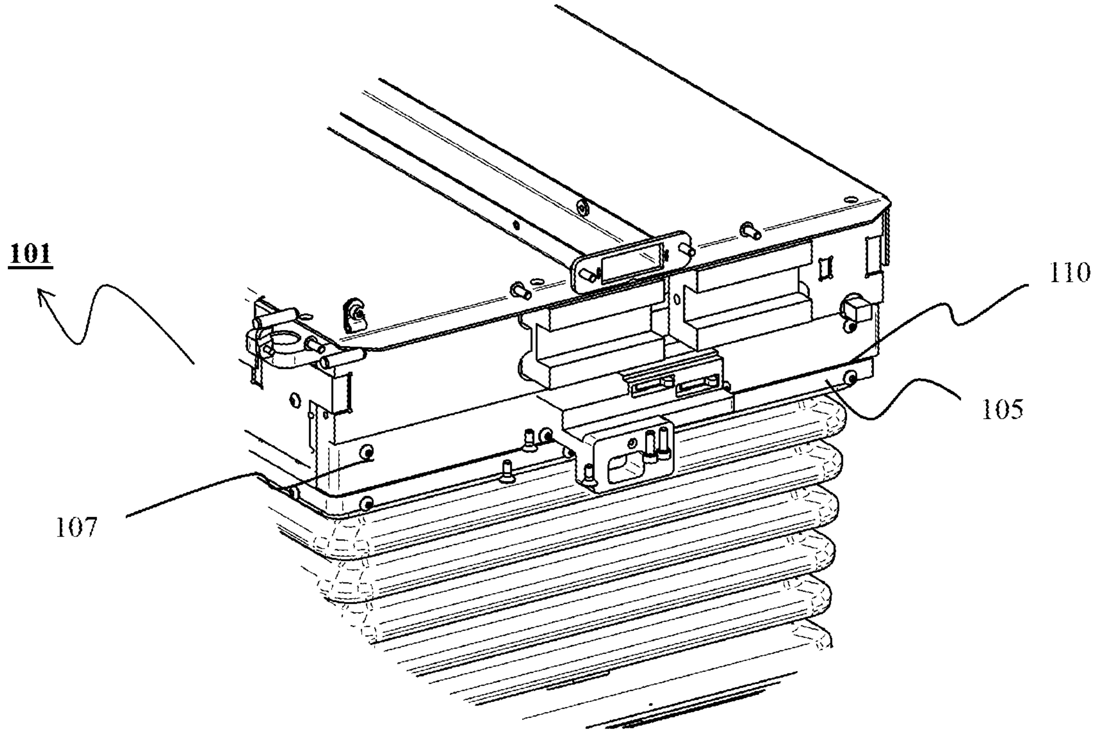
FIG. 2 is another partial side stereoscopic view of the operating table as illustrated in FIG. 1, the first cover being omitted.
Figure 3:
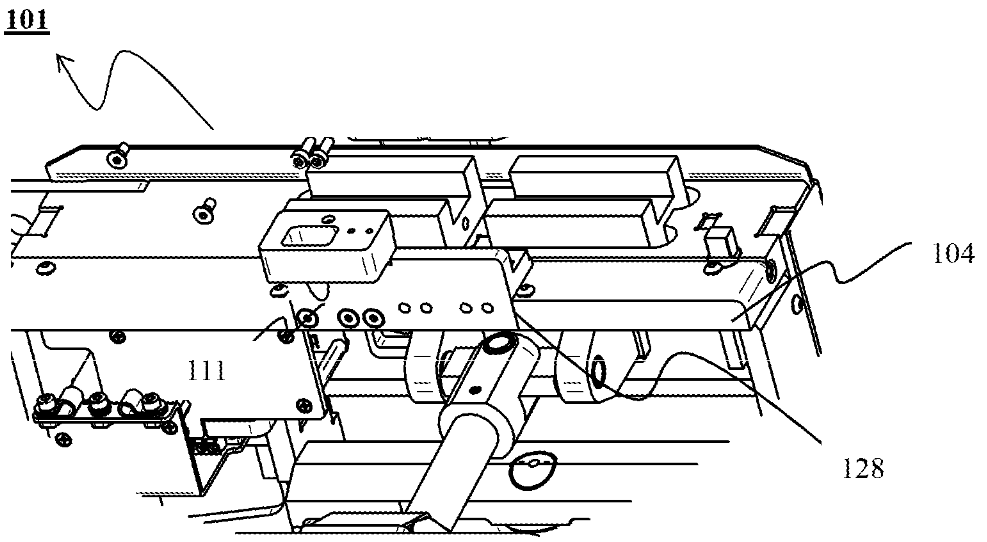
FIG. 3 is a partial bottom stereoscopic view illustrating the side of the operating table illustrated in FIG. 1.
Figure 4:
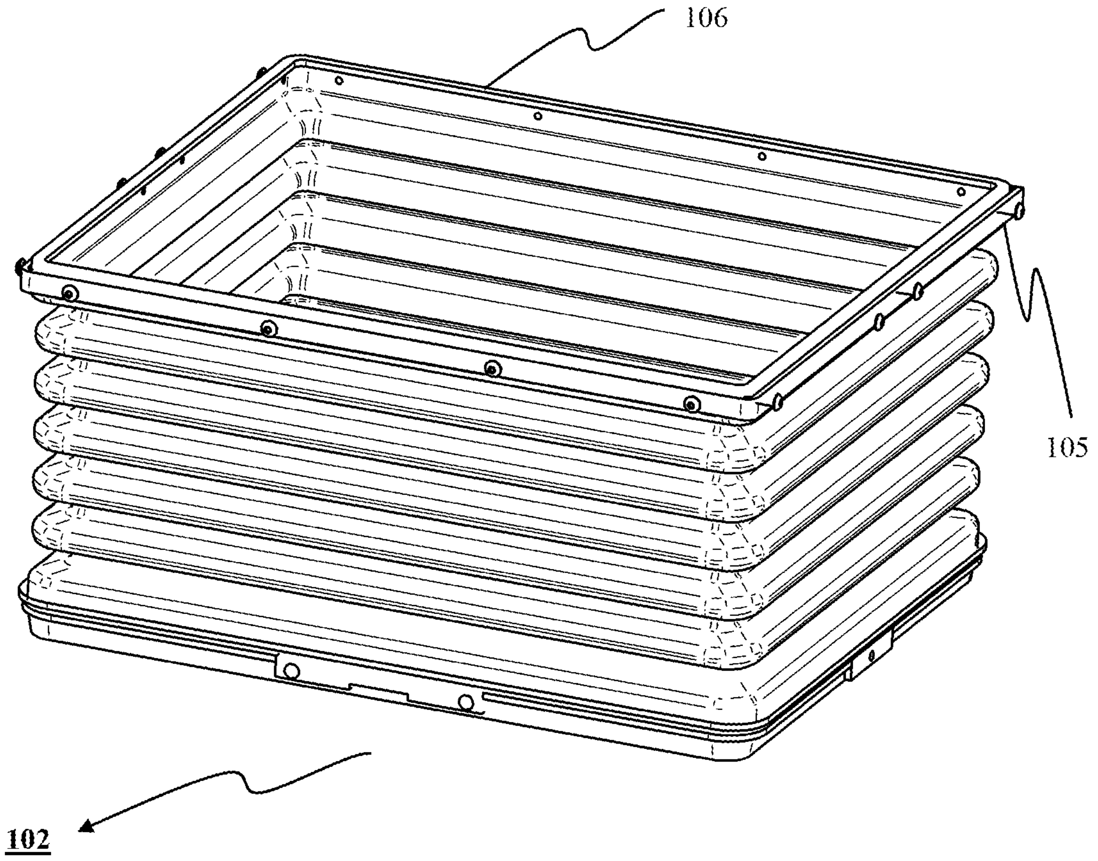
FIG. 4 is a stereoscopic view illustrating the bellows according to one example of the present disclosure.

FIG. 1 is a partial side stereoscopic view of an operating table according to one example of the present disclosure, wherein the first cover 103 is mounted. FIG. 2 is another partial side stereoscopic view of the operating table as illustrated in FIG. 1, wherein the first cover 103 is omitted to better illustrate the connecting condition between the column head 101 and bellows 102. FIG. 3 is a partial bottom stereoscopic view illustrating the side of the operating table illustrated in FIG. 1, wherein the bellows 102 is not mounted. FIG. 4 is a stereoscopic view illustrating the bellows. In addition, in order to demonstrate the specific details, in FIGS. 1-4 the table top support 113, energy chain 112 and cable 117 (see FIG. 5) and other parts are omitted.

As shown in FIGS. 1-2, the bellows 102 is mounted beneath the column head 101. The specific mounting mode of the bellows 102 will be described hereinafter. At first, at least one first cover 103 is preassembled to the bellows 102, and concretely, the lower edge region of the at least one first cover 103 is connected to the upper frame 105 of the bellows 102, and then the bellows 102 preassembled with the first cover 103 is positioned beneath the column head 101 in such a way that the top surface 106 of the bellows 102 abuts against the bottom surface 104 of the column head 101, and the bellows 102 is hold in place by using retainers such as clips, so that the top surface 106 of the bellows 102 is pressed against the bottom surface 104. Hereby, a seal is formed between the top surface 106 of bellows 102 and the bottom surface 104 of the column head 101, so as to prevent the unwanted substances such as water or particles from invading the column head 101 from the space between the top surface 106 and the bottom surface 104. In this case, the bellows 102 forms a sealing structure for the column head 101.

Subsequently, the first cover 103 is secured to the column head 101 by using fasteners such as bolts, and thereby a gap 110 between the column head 101 and the upper frame 105 that is prone to ingress of the unwanted substances is covered, and also the bellows 102 is firmly connected to the column head 101 by the first cover 103. Specially, the first cover 103 covers the lower section 107 of the column head 101 and the upper frame 105 of the bellows 102.

Here, the bellows 102 are made from a flexible material such as rubber so as to be flexibly telescopic with the lifting motion of the column head 101. Further, the flexible bellows contributes to the sealing abutment of the top surface 106 of the bellows 102 against the bottom surface 104 of the column head 101 so as to guarantee the sealability of the column head 101 at this place.

In the disclosed embodiment, the bottom surface 104 of the column head 101 is processed to be a smooth surface to promote the abutting tightness of the top surface 106 of the bellows 102 against the bottom surface 104 of the column head 101, thereby enhancing the sealing effect.

In the disclosed embodiment, the first cover 103 is formed from a metal plate, to minimize and reduce the gaps between the first cover 103 and the lower section 107, upper frame 105 as far as possible, thereby reducing the possibility of ingress of the unwanted substances into the column head 101. On the other hand, the substances that invade through the clearance 109 between the first cover 103 and the upper section 108 of the column head 101 must advance to the gap 110 between the upper frame 105 and the column head 101, and only in this way these substances may enter the column head 101. To this regard, the offset arrangement between the clearance 109 and the gap 110 can reduce the possibility of ingress of the substances to a great extent.

Figure 5:
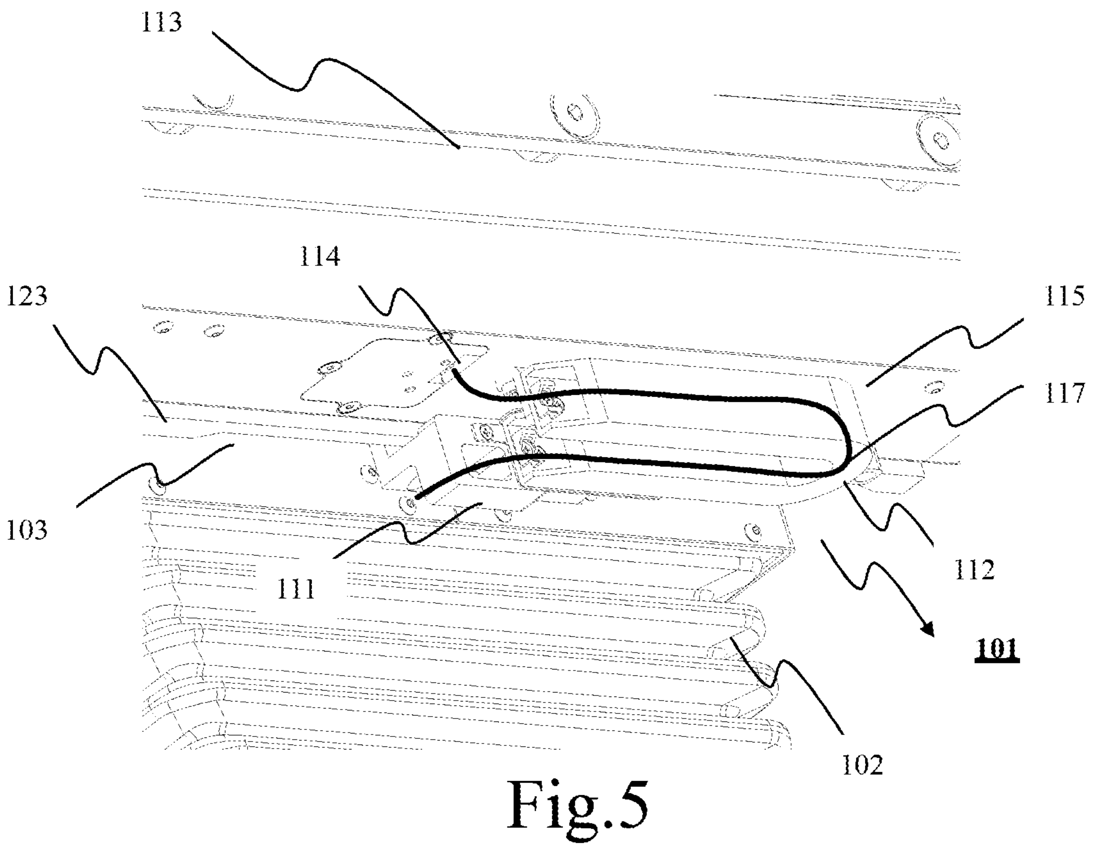
FIG. 5 is a partial side stereoscopic view of an operating table according to one example of the present disclosure.
Figure 6:
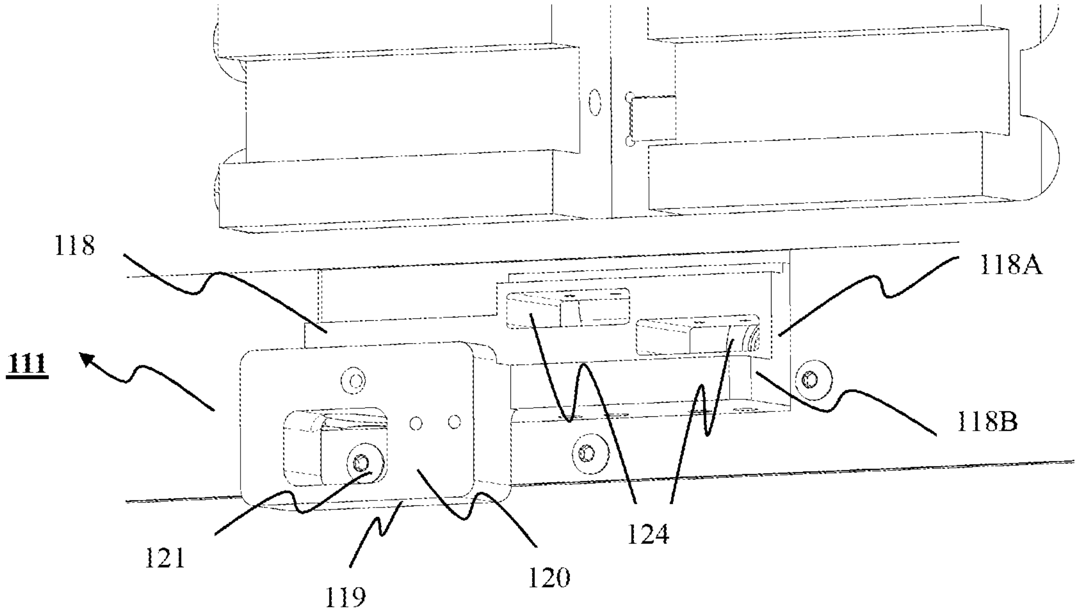
FIG. 6 is an enlarged view of holder 111 illustrated in FIG. 5.
Figure 7:
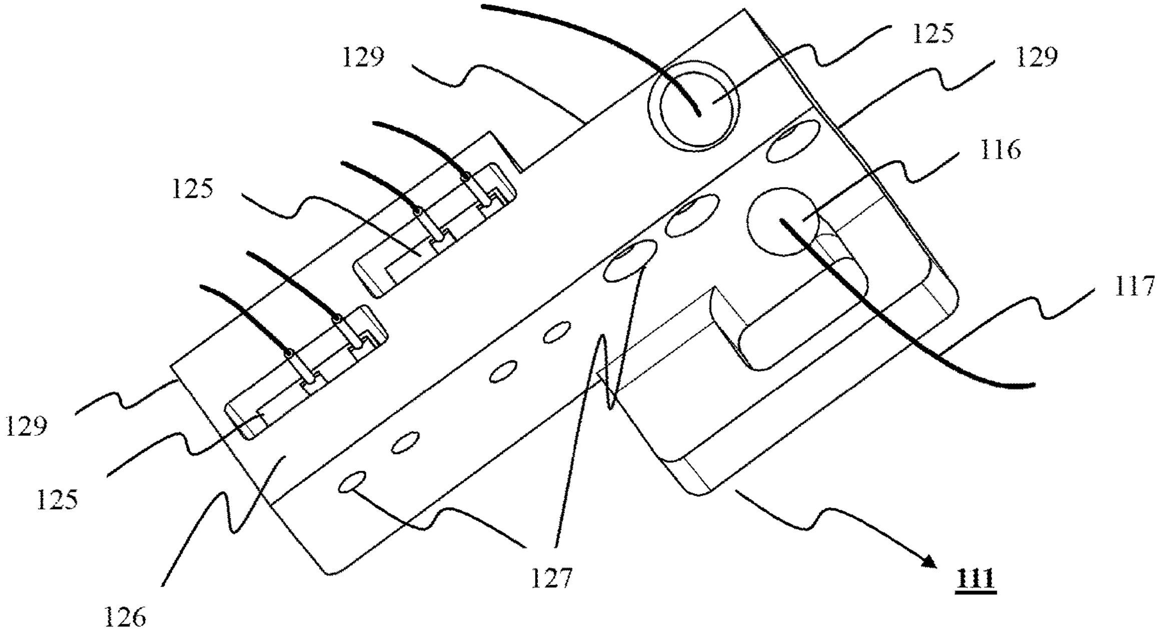
FIG. 7 is a rear stereoscopic view of the holder 111 illustrated in FIG. 5.

FIG. 5 is a partial side stereoscopic view of an operating table according to one example of the present disclosure. FIG. 6 is an enlarged view of holder 111 in FIG. 5, and FIG. 7 is a rear stereoscopic view of the holder 111 in FIG. 5.

As shown in FIGS. 5-6, the holder 111 acting as a mounting seat of sleeve-type energy chain 112 is arranged on the column head 101. Concretely, one end of the energy chain 112 is secured to the holder 111, and the other end is secured to the bottom side 115 of the table top support 113. The cable 117 that extends from the slotted hole 114 at the bottom side 115 extends through the energy chain 112 and into the column head 101 through the hole 116 in the holder 111. Here, the cable 117 is for example an electric/electronic component in the table top support 113, such as motor or connecting cable of sensors.

In the disclosed embodiment, the main body of the column head 101 is provided with an indentation 128 in which the holder 111 is received, as shown in FIG. 3. The indentation 128 is a feedthrough indentation, and when the holder 111 is assembled in the indentation 128, the rear side surface 126 of the holder 111 is at least partially flush with the corresponding inner side surface of the main body of the column head 101.

In this case, in order to avoid forming a substance ingress passage between the inner circumferential surface of the indentation 128 and the circumferential surface portion 129 of the holder 111 engaging with the inner circumferential surface of the indentation 128 when the holder 111 is assembled within the indentation 128, it is required to reduce the manufacturing tolerance of that assembling region as far as possible, for example, the manufacturing tolerance of the assembling region is +/−0.1.

In the disclosed embodiment, the holder 111 and the column head 101 are integrally formed.

Here, the cable 117 is nested within the energy chain 112 so as to protect and guide the exposed cable 117 and also avoid winding of the cable 117. Since the table top support 113 possibly needs to move according to the actual situation, the configuration of the energy chain 112 also needs to be flexible. Thus, the energy chain 112 may be made from a flexible material so as to adapt for the movability of the table top support 113.

As shown in FIGS. 5-7, the holder 111 has a first segment 118 and a second segment 119, wherein the first segment 118 and the second segment 119 may be integrally formed and the first segment 118 is located behind the second segment 119. In the disclosed embodiment, the first segment 118 is attached to the column head 101, and the energy chain 112 is attached to the second segment 119.

The first segment 118 has a vertically extending first region 118A and also has a horizontally extending second region 118B. The first region 118A is drilled with at least one window 124 for accommodating the limit switch (not shown), which is used for limiting the stroke of the table top support 113, especially longitudinally moving stroke. In addition, the first region 118A is further drilled with a hole 116 for letting the cable 117 through.

To prevent the unwanted substances such as water or particles from invading the column head 101 from the hole 116 and the window 124, the hole 116 and the window 124 are sealed by an adhesive 125, as shown in FIG. 7. Especially, the cable 117 is secured within the hole 116 by the adhesive 125.

In the disclosed embodiment, the adhesive 125 may be an elastic adhesive, so that the position of the cable 117 in the hole 116 exhibits the flexibility to a certain degree, so as to reduce tensile force suffered by the cable 117 when the table top support 113 moves.

The second segment 119 has an outwardly facing vertical surface 120, to which the energy chain 112 is attached. In the disclosed embodiment, the middle portion of the second segment 119 is hollowed out, that is, the second segment 119 has a through region 121. Such hollowing-out configuration can advantageously reduce the weight of the second segment 119, so as to reduce the weight load endured by the first segment 118.

In the disclosed embodiment, the hole 116 is configured to be close to the end of the energy chain 112 secured to the holder 111, to shorten as far as possible the cable section of the cable extending from that end of the energy chain 112, which cable section is exposed to environment, thereby reducing the risk.

In the disclosed embodiment, the second region 118B of the first segment 118 extends between the second segment 119 and the first region 118A of the first segment 118 to form the table top support 113, especially a horizontally supporting guide of the component 123 of the table top support 113.

In the disclosed embodiment, the holder 111, especially the bottom of the first segment 118 of the holder 111, is provided with a plurality of bores 127 especially threaded bores, and the bores 127 function to assemble other components and the column head 101 together.

Figure 8:
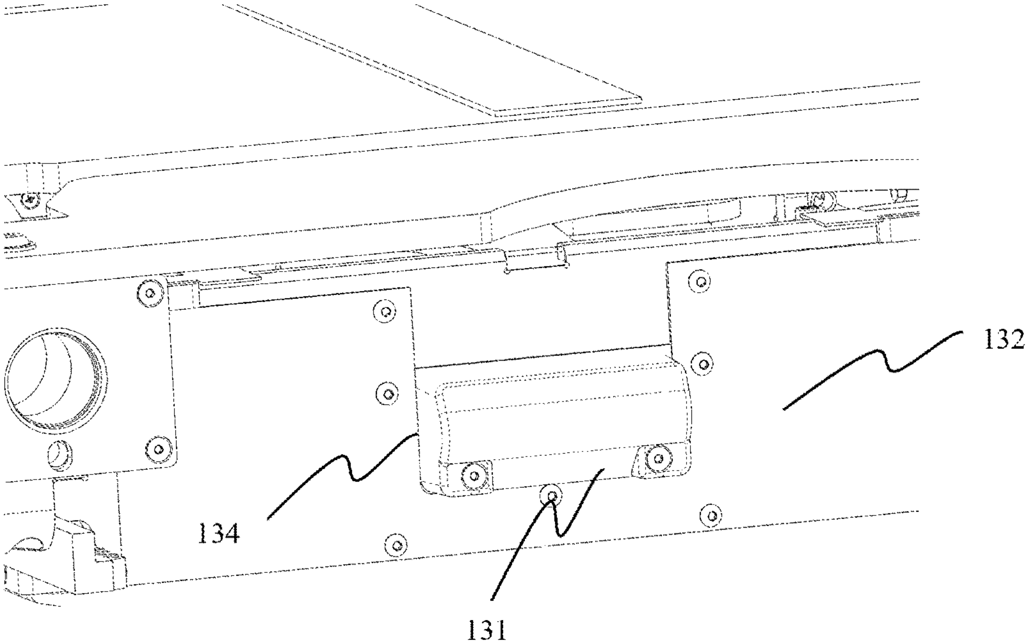
FIG. 8 is a partial side stereoscopic view of an operating table according to one example of the present disclosure.
Figure 9:
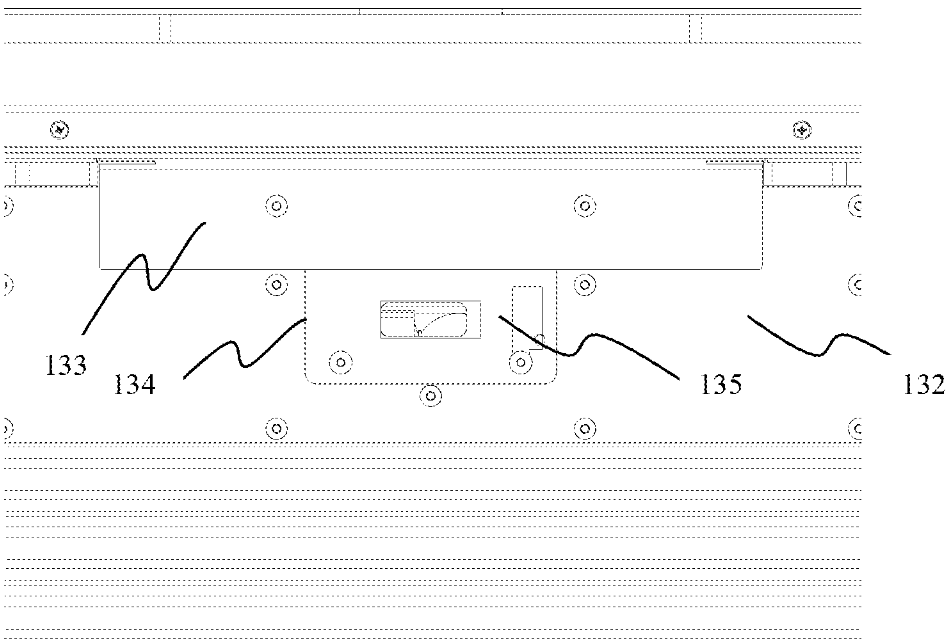
FIG. 9 is a partial side view of the operating table illustrated in FIG. 8, wherein receiver 131 is not mounted.
Figure 10:
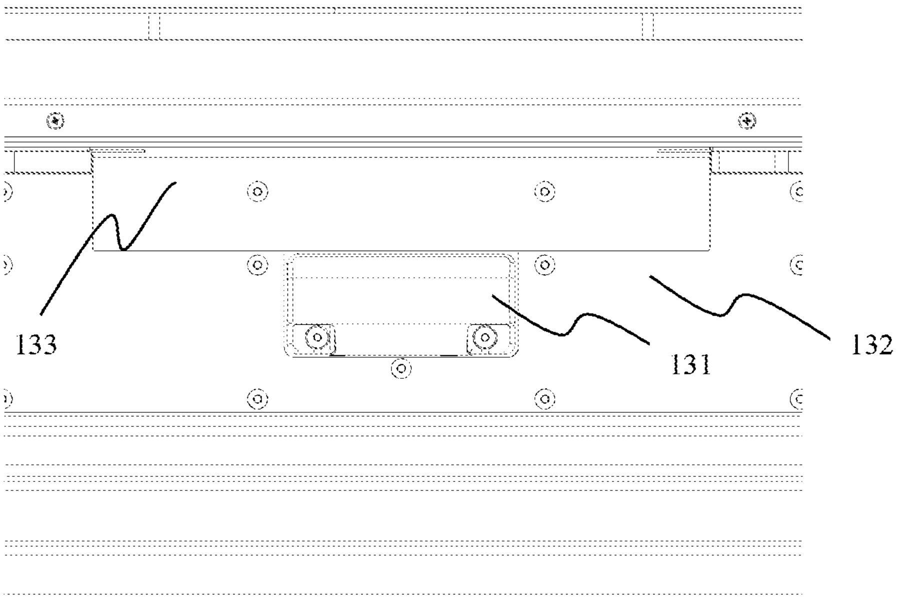
FIG. 10 is another partial side view of the operating table illustrated in FIG. 8, wherein the receiver 131 is mounted.

FIG. 8 is a partial side stereoscopic view of an operating table according to one example of the present disclosure, wherein the third cover 133 is omitted. FIG. 9 is a partial side view of the operating table illustrated in FIG. 8, wherein the receiver 131 is not mounted. FIG. 10 is another partial side view of the operating table illustrated in FIG. 8, wherein the receiver 131 is mounted.

As shown in FIGS. 8-10, the second cover 132 and third cover 133 for covering the column head 101 collectively define a receiving window 134 for receiving the receiver 131, and the receiver 131 is attached to the column head 101 within the receiving window 134. In the disclosed embodiment, the second cover 132 delimits a lower boundary, a left boundary and a right boundary of the receiving window 134, while third cover 133 delimits an upper boundary of the receiving window 134.

In order to prevent the unwanted substances such as water or particles from invading the column head 101 from the gap between the receiver 131 and the boundaries of the receiving window 134, a gasket 135 is disposed below the receiver 131, i.e., between the receiver 131 and the column head 101. The shape of the gasket 135 generally corresponds to the shape of the receiving window 134. Further, it is preferable that the size of the gasket 135 is variable, that is, the gasket 135 is deformable. The original size of the gasket 135 may be less than that of the receiving window 134 to facilitate the installation. However, when the receiver 131 is attached to the column head 101 with the gasket 135 therebetween, the gasket 135 will become bigger due to the pressure applied by the receiver 131, such as a securing force exerted on the receiver by bolts, and as a result the edge of the gasket 135 expands outwardly to sealingly abut against the boundaries of the receiving window 134 (i.e., against the edges of the covers 132, 133 delimiting the receiving window 134), so that a seal for the unwanted substances such as water or particles is formed between the receiver 131 and the boundaries of the receiving window 134 (i.e., between the covers 132, 133 and the receiver 134).

Furthermore, in order to firmly fix the gasket 135, it is possible to make the partial region of the gasket 135 such as upper edge region overlap with the third cover 133, that is, the upper edge of the gasket 135 is pressed below the third cover 133.

In the disclosed embodiment, the receiver 131 is an IR receiver.

In the disclosed embodiment, the second cover 132 and/or third cover 133 are formed from a metal plate.

In the disclosed embodiment, the second cover 132/third cover 133 is integrally formed with the first cover 103.

In the disclosed embodiment, the gasket 135 is a specially flat gasket made from rubber.

Figure 11:
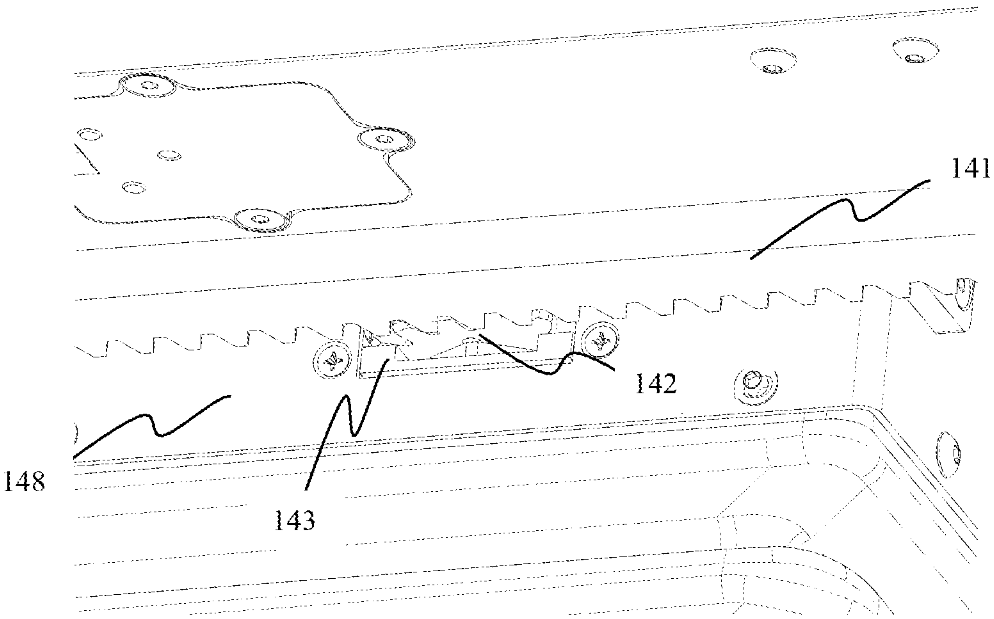
FIG. 11 is a partial bottom stereoscopic view of an operating table according to one example of the present disclosure, wherein the rack 141 is meshed with the gear 142.
Figure 12:
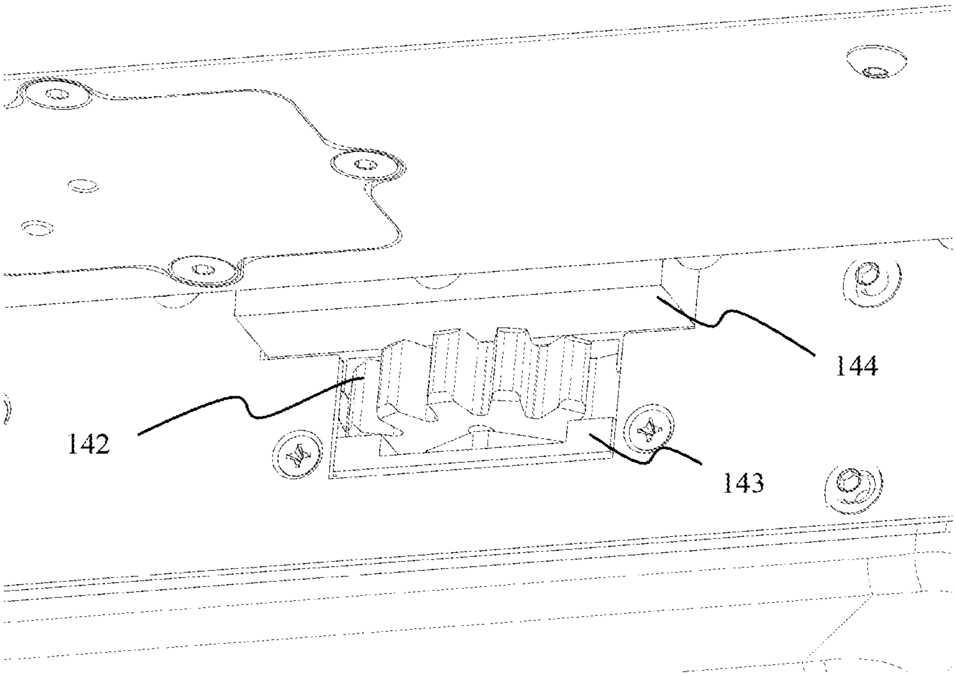
FIG. 12 is another partial bottom stereoscopic view of the operating table shown in FIG. 11, wherein the rack 141 is not meshed with the gear 142.
Figure 13:
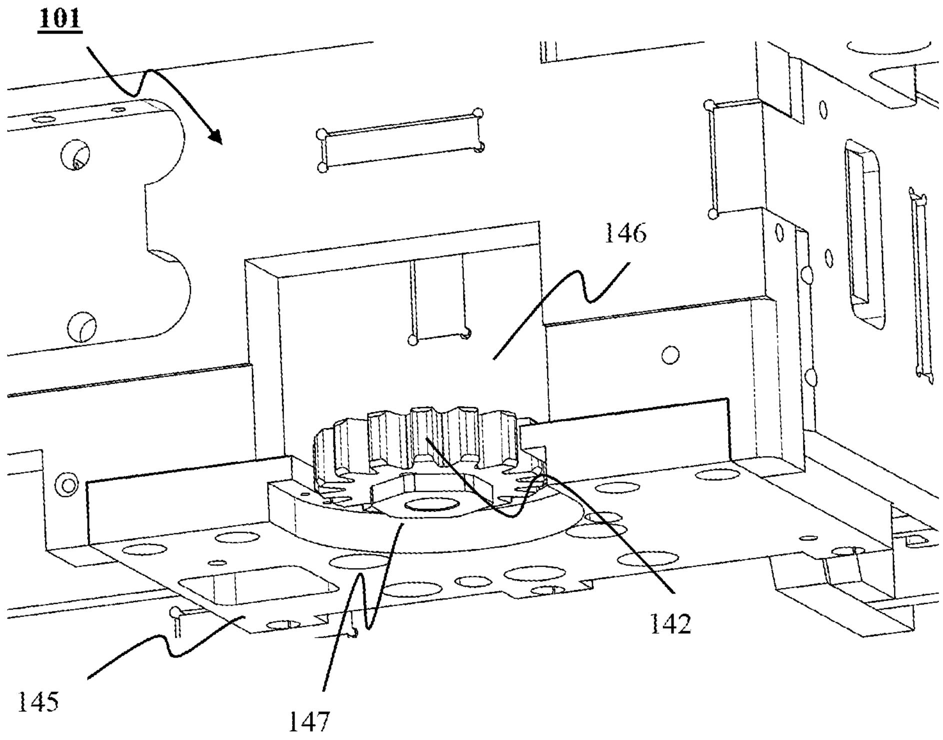
FIG. 13 is a partial stereoscopic view of the operating table shown in FIG. 11, wherein shield 143 is not mounted.
Figure 14:
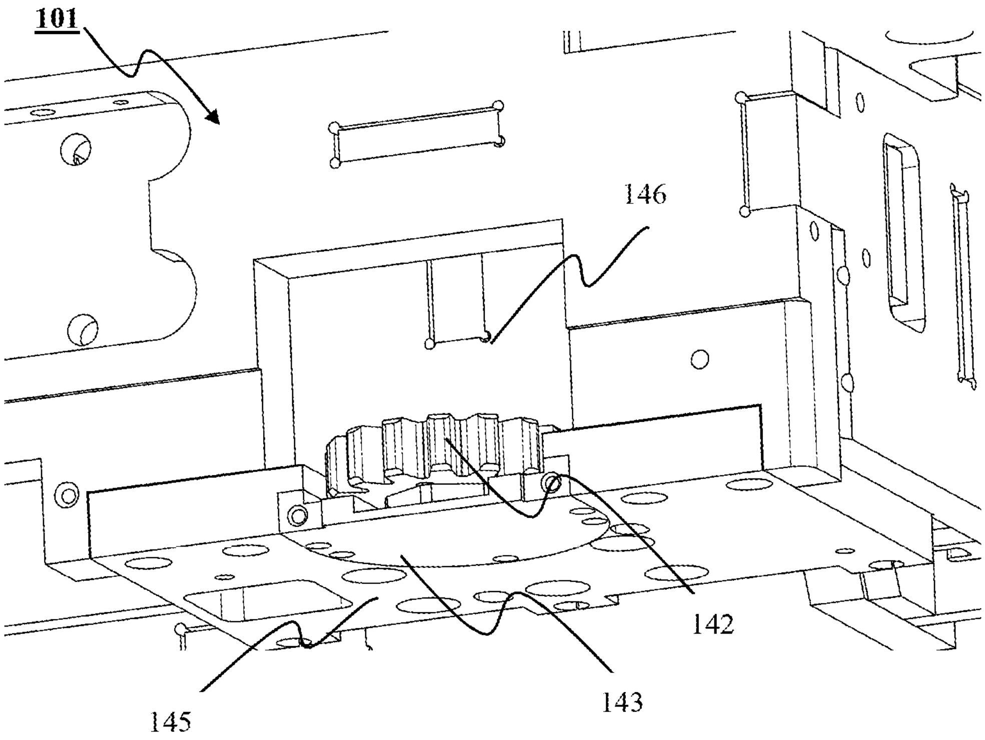
FIG. 14 is another partial stereoscopic view of the operating table shown in FIG. 11, wherein the shield 143 is mounted.

FIG. 11 is a partial bottom stereoscopic view of an operating table according to one example of the present disclosure, wherein the rack 141 is meshed with the gear 142. FIG. 12 is another partial bottom stereoscopic view of the operating table shown in FIG. 11, wherein the rack 141 is not meshed with the gear 142. FIG. 13 is a partial stereoscopic view of the operating table shown in FIG. 11, wherein the shield 143 and gear box 144 are not mounted. FIG. 14 is another partial stereoscopic view of the operating table shown in FIG. 11, wherein the shield 143 is mounted, while the gear box 144 is not mounted.

As shown in FIGS. 11-14, the gear box 144 is mounted on the column head 101. Especially, the gear box 144 is received, in such a way of one side thereof projecting outwardly, in a depression 146 on the column head 101. Further, the gear 142 that is meshed with the rack 141 of the table top support 113 is located beneath the gear box 144 and projects forwardly relative to the column head 101 so as to be meshed with the rack 141 without hindrance, thereby driving translation of the table top support 113 by driving the rack 141.

Beneath the gear box 144 (i.e., beneath the depression 146), a support plate 145 is mounted, which extends horizontally and the upper surface of which is simultaneously engaged with the bottom of the gear box 144 and the bottom of the column head 101, so as to support the gear box 144 from below and keep the gear box 144 on the column head 101. A notch 147 is disposed at the place of the support plate 145 corresponding to the gear 142, and the notch 147 is configured to be capable of receiving at least one portion of the gear 142. In the disclosed embodiment, the notch 147 has a semicircular or generally horseshoe-like contour.

The shield 143 is received in the notch 147 in a positive-fit manner, especially sealingly, in other words, the shield 143 is sealingly engaged with the notch 147 to prevent the unwanted substances such as water or particles from invading the column head 101 from the opening where the gear 142 is located. In the disclosed embodiment, when the shield 143 is received in the notch 147, the lower surface of the shield 143 is flush with the lower surface of the support plate 145.

A fourth cover 148 is attached to the column head 101. In the disclosed embodiment, the fourth cover 148 at least partially covers the support plate 145 and shield 143 in a gap-free fitting fashion.

In the disclosed embodiment, the fourth cover 148 is formed from a metal plate.

In the disclosed embodiment, the fourth cover 148 is integrally formed with the second cover 132 or third cover 133, and/or the first cover 103.

The above several specific approaches for sealing are not only suitable for the operating tables according to the illustrated examples, but also suitable for operating tables of other structures.

Although some examples have been described, these examples are provided just as being examples, without being intended to limit the scope of the present disclosure. The appended claims and their equivalents are intended to cover all the modifications, alternatives and changes falling within the range and spirit of the present disclosure.

The respective examples of the present disclosure will be described in details hereinafter with reference to the drawings.

Figure 15:
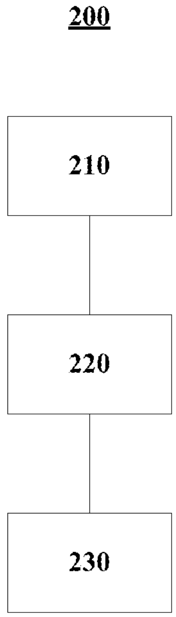
FIG. 15 is a schematic view of an operating table according to one example of the present disclosure.

Now referring to FIG. 15, it is a schematic view of an operating table according to one example of the present disclosure. As shown in FIG. 15, the operating table 200 may include a table body 210, a motor 220 and control equipment 230.

The table body 210 is to bear the patient undergoing the surgery. The motor 220 may manipulate the table body 210, wherein such manipulations may include, but are not limited to, translation, elevation, drop and/or inclination of the table body 210 and the like. There may be one or more motors 220. The control equipment 230 is to control the motor 220 so as to accomplish the manipulation for the table body 210. The control equipment 230 may enable the operating table 200 to work in the normal working mode or emergency mode.

Figure 16:
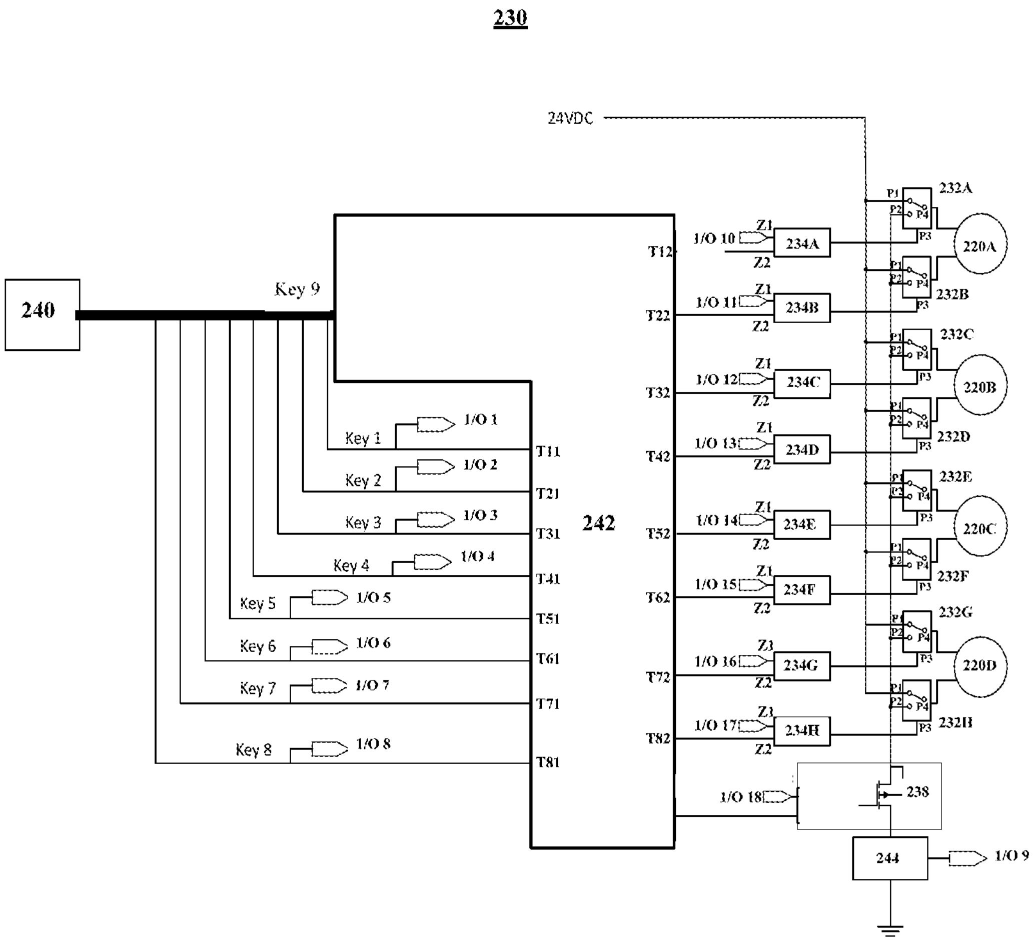
FIG. 16 is a schematic view of control equipment according to one example of the present disclosure.

Now referring to FIG. 16, it is a schematic view of the control equipment according to one example of the present disclosure. The control equipment 230 shown in FIG. 16 is used for controlling four motors 220A-220D of the operating table 200.

As shown in FIG. 16, the control equipment 230 may include relays 232A-232H, multiplexers 234A-234H, a microcontrol unit W (MCU, not shown), a driver 238, a keyboard 240, a control module 242 and a current detector 244.

The relays 232A and 232B constitute a pair of relays for the motor 220A. Here, an output end P4 of the relay 232A and an output end P4 of the relay 232B are respectively connected to both ends of the motor 220A. The respective normally-closed input ends P1 of the relays 232A and 232B both are connected to a DC power source of 24 volts.

Similarly, the relays 232C and 232D constitute a pair of relays for the motor 220B, the relays 232E and 232F constitute a pair of relays for the motor 220C, and the relays 232G and 232H constitute a pair of relays for the motor 220D.

Each multiplexer of the multiplexers 234A-234H comprises two input terminals Z1, Z2 and one output terminal, for connecting the input terminal of its two input terminals Z1, Z2 having an input signal to its output terminal, and feeding the signal received by that input terminal to its output terminal. The output terminals of the multiplexers 234A-234H are connected to the control input ends P3 of the relays 232A-232H, respectively.

The keyboard 240 at least has nine keys, i.e., Key 1-Key 8 and emergency Key 9. Here, Key 1 and Key 2 are used for controlling rotation of the motor 220A, Key 3 and Key 4 controlling rotation of the motor 220B, Key 5 and Key 6 controlling rotation of the motor 220C, Key 7 and Key 8 controlling rotation of the motor 220D, and emergency Key 9 indicating an emergency mode of the operating table 200.

The microcontrol unit W has input pins I/O1-I/O9 and output pins I/O10-I/O18. Here, the input pins I/O1-I/O9 of the microcontrol unit W are respectively connected to Key 1, Key 2, Key 3, Key 4, Key 5, Key 6, Key 7, Key 8 and the output end of the current detector 244, and the output pins I/O10-I/O17 of the microcontrol unit W are respectively connected to the input terminals Z1 of the multiplexers 234A-234H, and the output pin I/O18 of the microcontrol unit W is connected to the driver 238.

In the case of being not disabled (that is, the operating table 200 works at the normal working mode), the microcontrol unit W continuously outputs a pulse-width-modulated (PWM) signal as drive signal to the driver 238 via the output pin I/O18, and it is detected which key among Key 1-Key 8 is pressed down. When it is detected that Key 1 (Key 2, Key 3, Key 4, Key 5, Key 6, Key 7 or Key 8) of the keyboard 240 is pressed down, the microcontrol unit W outputs a signal to the corresponding multiplexer 234A (234B, 234C, 234D, 234E, 234F, 234G or 234H).

The driver 238 is connected between the normally-opened input end P2 of the relays 232A-232H and the ground. Upon receiving the PWM signal as drive signal, the driver 238 works to make the normally-opened input ends P2 of the relays 232A-232H connected to the ground. If no PWM signal is received, the driver 238 will not work, and the normally-opened input ends P2 of the relays 232A-232H will not be connected to the ground. The driver 238 may be for example a CMOS transistor and so on.

The current detector 244 is used to detect magnitude of the electrical current flowing through the driver 238.

The control module 242 is embodied only by hardware. The control module 242 may comprise eight pairs of terminals, i.e., one input terminal T11 and one output terminal T12 as a first pair of terminals; one input terminal T21 and one output terminal T22 as a second pair of terminals; one input terminal T31 and one output terminal T32 as a third pair of terminals; one input terminal T41 and one output terminal T42 as a fourth pair of terminals; one input terminal T51 and one output terminal T52 as a fifth pair of terminals; one input terminal T61 and one output terminal T62 as a sixth pair of terminals; one input terminal T71 and output terminal T72 as a seventh pair of terminals; and one input terminal T81 and one output terminal T82 as an eighth pair of terminals. Here, the input terminals Ti1-T81 are connected to Key 1-Key 8 of the keyboard 240 respectively, and the output terminals T12-T82 are respectively connected to the other input terminals Z2 of the multiplexers 234A-234H that are not connected with the microcontrol unit W.

The control module 242 is used to detect whether the emergency key (Key 9) on the keyboard 240 for indicating the emergency mode is pressed down. Where it is detected that the emergency Key 9 is pressed down, the control module 242 disables the microcontrol unit W, connects the input terminal and output terminal included in each pair of terminals thereof to connect the multiplexers 234A-234H to Key 1-Key 8 of the keyboard 240 respectively, and outputs a drive signal to the driver 238 so as to cause the operating table 200 enter the emergency mode. Where it is detected that the emergency Key 9 is not pressed down, the control module 242 will not disable the microcontrol unit W, and break the connection between the input terminal and output terminal included in each pair of terminals thereof so as to disconnect the multiplexers 234A-234H from Key 1-Key 8 respectively, and will not output a drive signal to the driver 238 so as to make the operating table 200 work in the normal working mode.

The working process of the control equipment 230 will be described hereinafter.

If the user does not push the emergency key (Key 9) on the keyboard 240, the control module 242 will detect that the emergency key (Key 9) is not pressed down, and thus confirm that the operating table 200 is in the normal working mode. Consequently, the control module 242 does not disable the microcontrol unit W, and breaks the connection between the input terminal and output terminal included in each pair of terminals thereof so as to disconnect the multiplexers 234A-234H from Key 1-Key 8 respectively, and does not output a drive signal to the driver 238.

In a case where the operating table 200 is in the normal working mode, the microcontrol unit W outputs a PWM signal to the driver 238 as the drive signal, so that the driver 238 runs to make the normally-opened input ends P2 of the relays 232A-232H connected to the ground. When the user pushes Key 1 (Key 2, Key 3, Key 4, Key 5, Key 6, Key 7 or Key 8) of the keyboard 240, the microcontrol unit W will detect that Key 1 (Key 2, Key 3, Key 4, Key 5, Key 6, Key 7 or Key 8) is pressed down, and output a signal to the corresponding multiplexer 234A (234B, 234C, 234D, 234E, 234F, 234G or 234H). Upon receiving the signal from the microcontrol unit W, the multiplexer 234A (234B, 234C, 234D, 234E, 234F, 234G or 234H) will connect the input terminal Z1 that receives the signal from the microcontrol unit W to its output terminal, so as to output a control signal to the control input end P3 of the relay 232A (232B, 232C, 232D, 232E, 232F, 232G or 232H). Correspondingly, the relay 232A (232B, 232C, 232D, 232E, 232F, 232G or 232H) connects its normally-opened input end P2 to its output end P4. Thus, the motor 220A, 220B, 220C or 220D starts to rotate due to the electrical current flowing therethrough.

If the user pushes the emergency key (Key 9) of the keyboard 240, the control module 242 will detect that the emergency key (Key 9) is pressed down, and thus confirm that the operating table 200 enters the emergency mode. Consequently, the control module 242 will disable the microcontrol unit W, and connect the input terminal and output terminal included in each pair of terminals thereof to connect the multiplexers 234A-234H to Key 1-Key 8 respectively, and output a drive signal to the driver 238 as PWM signal.

In a case where the operating table 200 is in the emergency mode, the control module 242 (rather than microcontrol unit W) outputs the drive signal to the driver 238 so that the driver 238 runs to make the normally-opened input ends P2 of the relays 232A-232H connected to the ground. When the user pushes Key 1 (Key 2, Key 3, Key 4, Key 5, Key 6, Key 7 or Key 8) on the keyboard 240, the signal of Key 1 (Key 2, Key 3, Key 4, Key 5, Key 6, Key 7 or Key 8) is directly transmitted to the input terminal Z2 of the multiplexer 234A (234B, 234C, 234D, 234E, 234F, 234G or 234H). Upon receiving the signal of Key 1 (Key 2, Key 3, Key 4, Key 5, Key 6, Key 7 or Key 8), the multiplexer 234A (234B, 234C, 234D, 234E, 234F, 234G or 234H) connects the input terminal Z2 that receives the signal to its output terminal, to output the control signal to the control input end P3 of the relay 232A (232B, 232C, 232D, 232E, 232F, 232G or 232H). Correspondingly, the relay 232A (232B, 232C, 232D, 232E, 232F, 232G or 232H) connects its normally-opened input end P2 to its output end P4. Thus, the motor 220A, 220B, 220C or 220D starts to rotate due to the electrical current flowing therethrough.

As can be seen from the above description, the solution defined in this example makes use of the hardware for embodying the control module 242 that causes the operating table 200 to enter and work in the emergency mode. On the contrary, in the prior art the control module 242 usually is embodied by the microcontrol unit. The microcontrol unit is more inclined to use software that is prone to failure, but the hardware is relatively stable and is less prone to failure. Thereby, the solution defined in the example can ensure that the operating table reliably runs in the emergency mode.

Figure 17:
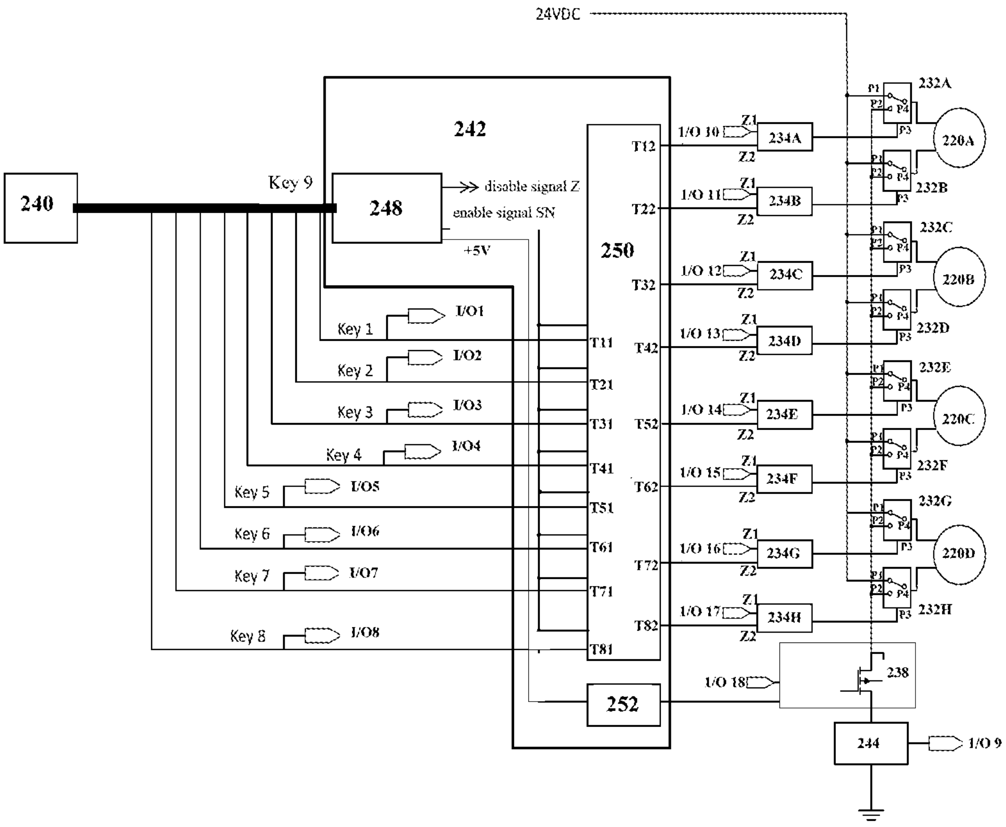
FIG. 17 is a schematic view of control module according to one example of the present disclosure.

Now referring to FIG. 17, it is a schematic view of a control module according to one example of the present disclosure. As shown in FIG. 17, the control module 242 may comprise a detection circuit 248, an optical isolator 250 as a connection control circuit, and a 555 timer 252 as a drive signal supply unit.

The detection circuit 248 is connected to the keyboard 240, microcontrol unit W, and optical isolator 250 and 555 timer 252. The detection circuit 248 whether emergency Key 9 of the keyboard 240 is pushed. When it is detected that the emergency Key 9 is pressed down, the detection circuit 248 provides a disable signal Z to the microcontrol unit W to disable the microcontrol unit W, and provides an enable signal SN (such as voltage of +3.3 volts) to the optical isolator 250, and outputs a voltage of +5 v as an indication signal to the 555 timer 252.

The optical isolator 250 comprises eight pairs of terminals, i.e., one input terminal T11 and one output terminal T12 as a first pair of terminals; one input terminal T21 and one output terminal T22 as a second pair of terminals; one input terminal T31 and one output terminal T32 as a third pair of terminals; one input terminal T41 and one output terminal T42 as a fourth pair of terminals; one input terminal T51 and one output terminal T52 as a fifth pair of terminals; one input terminal T61 and one output terminal T62 as a sixth pair of terminals; one input terminal T71 and one output terminal T72 as a seventh pair of terminals; and one input terminal T81 and one output terminal T82 as an eighth pair of terminals. Here, the input terminals T11-T81 are connected to Key 1-Key 8 of the keyboard 240 respectively, and the output terminal T12-T82 are connected to the other input terminals Z2 of the multiplexers 234A-234H that are not connected to the microcontrol unit W. If an enable signal SN is received from the detection circuit 248, the optical isolator 250 connects the input terminal and output terminal included in its each pair of terminals to make Key 1-Key 8 connected to the input terminals Z2 of the multiplexers 234A-234H respectively. If no enable signal SN is received from the detection circuit 248, the optical isolator 250 breaks the connection between the input terminal and output terminal included in its each pair of terminals to disconnect Key 1-Key 8 from multiplexers 234A-234H respectively. Here, the optical isolator 250 can electromagnetically isolate the keyboard 240 from the motors 220A-220D, to reduce or eliminate interference of the motors 220A-220D on the keyboard 240.

If the voltage of +5 v as indication signal is received from the detection circuit 248, the 555 timer 252 outputs a PWM signal to the driver 238 as drive signal. If no enable signal SN is received from the detection circuit 248, the 555 timer 252 will stop outputting the PWM signal to the driver 238 as drive signal.

Figure 18:
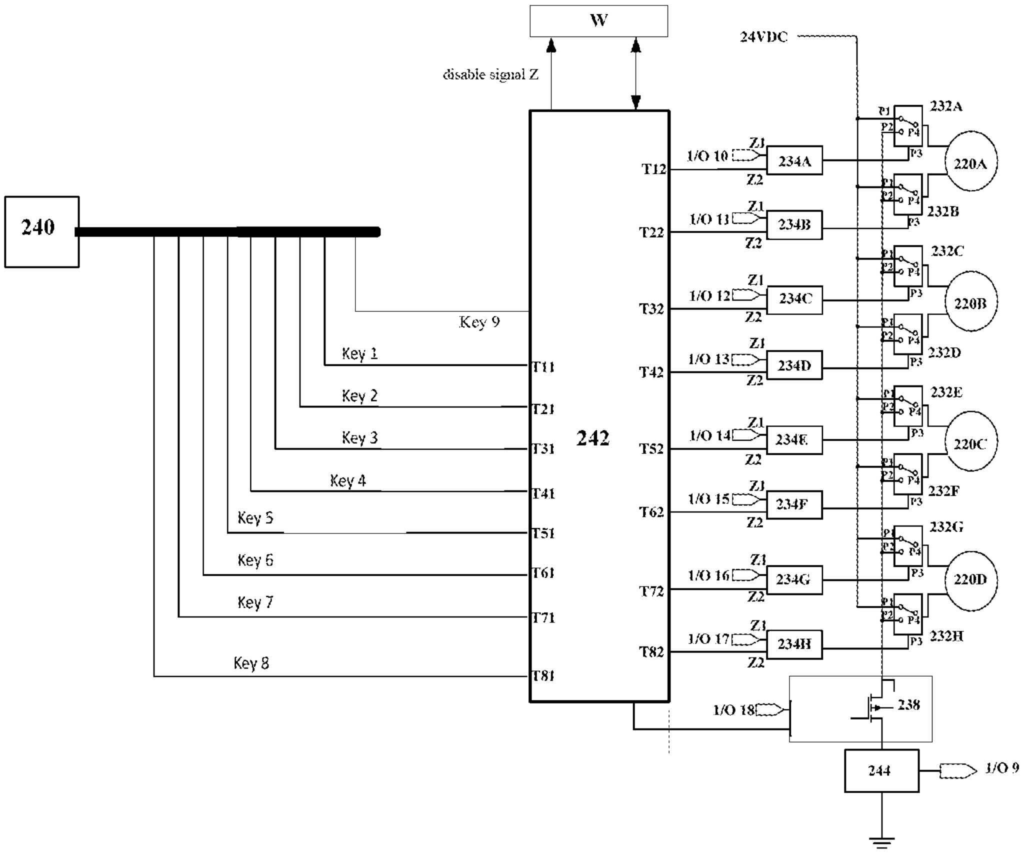
FIG. 18 is a schematic view of control module according to another example of the present disclosure.

Now referring to FIG. 18, it is a schematic view of a control module according to another example of the present disclosure. The control module 242 shown in FIG. 18 is embodied by a complex programmable logic device (CPLD).

In FIG. 18, the control module 242 detects whether emergency key (Key 9) on the keyboard 240 for indicating emergency mode is pressed down. If it is detected that the emergency Key 9 is pressed down, the control module 242 will send a disable signal N to the microcontrol unit W to disable the microcontrol unit W, and connect the input terminal and output terminal included in its each pair of terminals to connect the multiplexers 234A-234H to Key 1-Key 8 of keyboard 240 respectively, and output a drive signal to the driver 238 to make the operating table 200 enter emergency mode. If it is detected that the emergency Key 9 is not pressed down, the control module 242 will not send a disable signal N to the microcontrol unit W so as not to disable the microcontrol unit W, and will break the connection between the input terminal and output terminal included in its each pair of terminals to disconnect multiplexers 234A-234H from Key 1-Key 8 respectively, and will not output a drive signal to the driver 238 so that the operating table 200 runs in the normal working mode.

In addition, as shown in FIG. 18, the microcontrol unit W is not in direct connection with Key 1-Key 8 of the keyboard 240 for obtaining signals of Key 1-Key 8, but the control module 242 forwards the signals of Key 1-Key 8 to the microcontrol unit W for use.

It will be understood by those skilled in the art that, although in the above example the 555 timer 252 is used a drive signal supply unit for supplying the driver 238 with drive signal in the case of the operating table 200 being in the emergency mode, the present disclosure is not so limited. In other examples of the present disclosure, the drive signal supply unit may use any other proper devices capable of providing the drive signal, except for the 555 timer 252.

It will be understood by those skilled in the art that, although in the above example the control module 242 comprises such a drive signal supply unit as the 555 timer 252 for supplying the driver 238 with drive signal in the case of the operating table 200 being in the emergency mode, the present disclosure is not so limited. In other examples of the present disclosure, the control module 242 may not include a drive signal supply unit, and instead the detection circuit 248 supplies the driver 238 with a drive signal in a case where the operating table 200 is in the emergency mode.

It will be understood by those skilled in the art that, although in the above example the optical isolator 250 is used a connection control circuit for effecting or breaking the connection between keys of the keyboard 240 and the multiplexers 234A-234H, the present disclosure is not so limited. In other examples of the present disclosure, the connection control circuit also may be any other proper devices, except for the optical isolator 250.

It will be understood by those skilled in the art that, although in the above example the control module 242 is embodied by the detection circuit 248, connection control circuit and/or drive signal supply unit, the present disclosure is not so limited. In other examples of the present disclosure, the control module 242 also may be embodied in any other appropriate modes.

It will be understood by those skilled in the art that, although in the above example the operating table 200 comprises four motors 220A-220D, the present disclosure is not so limited. In other examples of the present disclosure, the operating table 200 also may comprise one, two, three or more than four motors, and here the amount of the relay, controller and microcontrol unit included in the control equipment 230 may vary as a function of the amount of motor included in the operating table 200.

It will be understood by those skilled in the art that, although in the above example the control equipment 230 comprises a current detector 244, the present disclosure is not so limited. In other examples of the present disclosure, the control equipment 230 may not include current detector 244.

It will be understood by those skilled in the art that, although in the above example the normally-closed input ends of relays 232A-232H are in connection with direct current of 24 volts, the present disclosure is not so limited. In other examples of the present disclosure, the normally-closed input ends of relays 232A-232H also may be in connection with direct current of other magnitude.

It will be understood by those skilled in the art that, although in the example of FIG. 18 the microcontrol unit W obtains the signals of Key 1-Key 8 of the keyboard 240 via control module 242, the present disclosure is not so limited. In other examples of the present disclosure, the microcontrol unit W also may be directly connected to Key 1-Key 8 of the keyboard 240 to obtain the signals of Key 1-Key 8 of the keyboard 240.

It will be understood by those skilled in the art that, although in the above example the control equipment 230 comprises the multiplexers 234A-234H for sending the signals from the microcontrol unit W or Key 1-Key 8 of the keyboard 240 to the control input end of the corresponding one in the relays 232A-232H, the present disclosure is not so limited. In other examples of the present disclosure, the control equipment 230 also may not have multiplexer 234A-234H. In a case where the control equipment 230 does not have multiplexer 234A-234H, the control input end of each relay of the relays 232A-232H is directly connected to the corresponding output terminals of the microcontrol unit W and control module 242.

It will be understood by those skilled in the art that, although in the above example the keyboard 240 is embodied by the elements that directly output key signals, the present disclosure is not so limited. In other examples of the present disclosure, the keyboard 240 may be embodied by any other devices capable of outputting digital signals (such as but not limited to matrix keyboard, sensors and the like).

It will be understood by those skilled in the art that various modifications and changes may be made to the above individual examples without departing from the spirit of the present disclosure. Thus, the extent of protection of the present disclosure is delimited by the appended claims.

Figure 19:
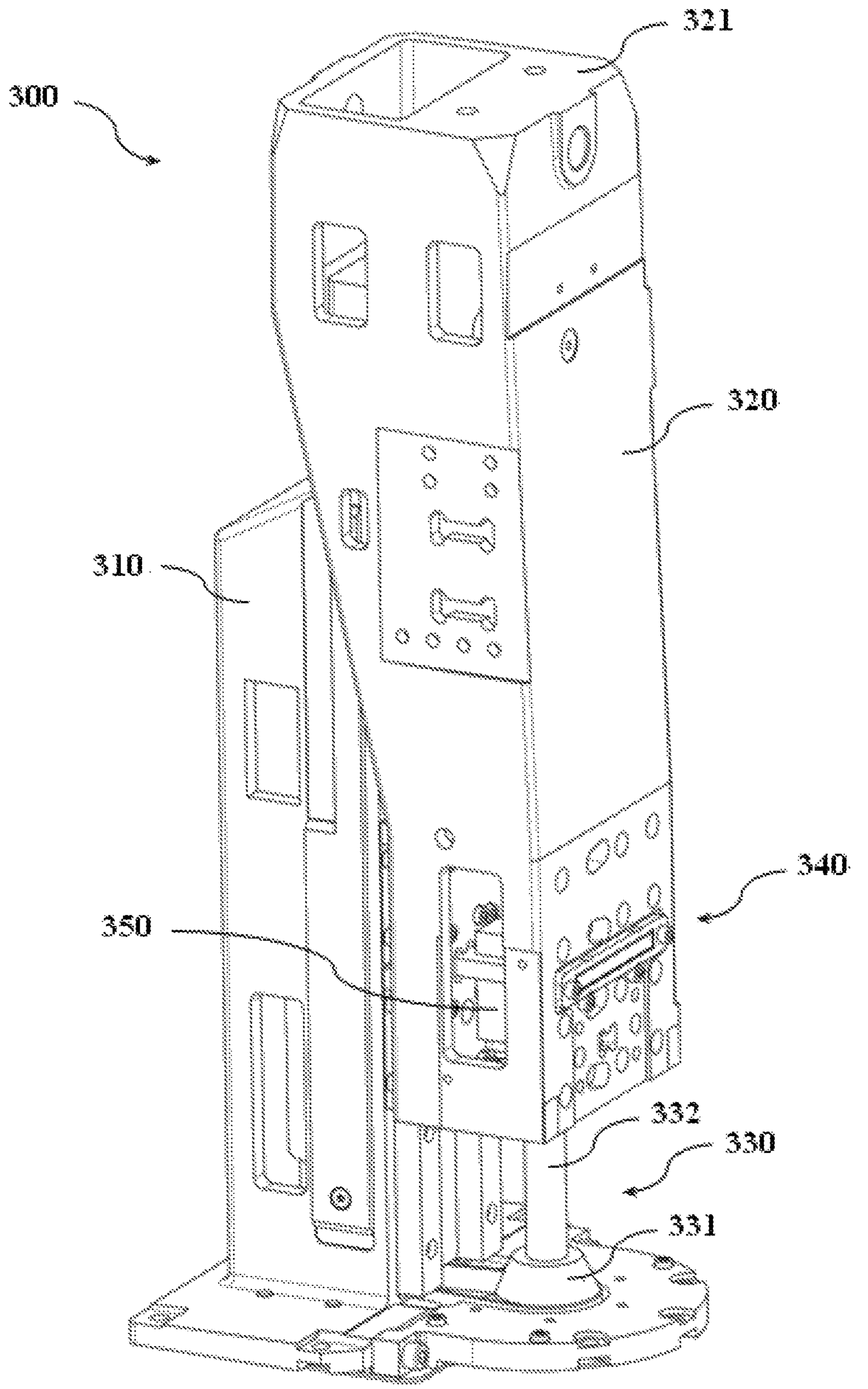
FIG. 19 illustrates a lifting device for use in an operating table according to one embodiment of the present disclosure, wherein the top column is in a raised position.

FIG. 19 illustrates a lifting device 300 for use in an operating table according to one embodiment of the present disclosure. The lifting device 300 for use in an operating table comprises a stationary bottom column 310, a top column 320 movable in the vertical direction, and a lifting mechanism 330 for moving the top column 320 in the vertical direction. The top surface 321 of the top column 320 may be fixedly connected to the operating table top directly or indirectly such as by bolts. The lifting mechanism 330 includes a screw-and-nut transmission, which has a lead screw 332 and a screw nut (not shown). The screw nut is received within and fixedly connected to a nut housing 350. In one embodiment of the present disclosure, the nut housing 350 is made from aluminum. In the illustrated embodiment, the lower end of the lead screw 332 has a conical disk 331 that can be in operative connection with a drive motor by as belt drive (not shown), for example, so that the conical disk 331 can be driven to rotate by controlling the drive motor to drive rotation of the lead screw 332. The screw-and-nut transmission is configured to convert rotary motion of the lead screw 332 into translational motion of the screw nut (and thereby nut housing 350) in the vertical direction. In the present disclosure, positioning and securing of the top column 320 and nut housing 350 are accomplished by a lifting fork 340, so that the raising and lowering movement of the top column 320 in the vertical direction can be controlled by the drive motor. The configuration of the lifting fork 340 and the mating relation between the nut housing 350 and the top column will be described in detail hereinafter.

Figure 20:
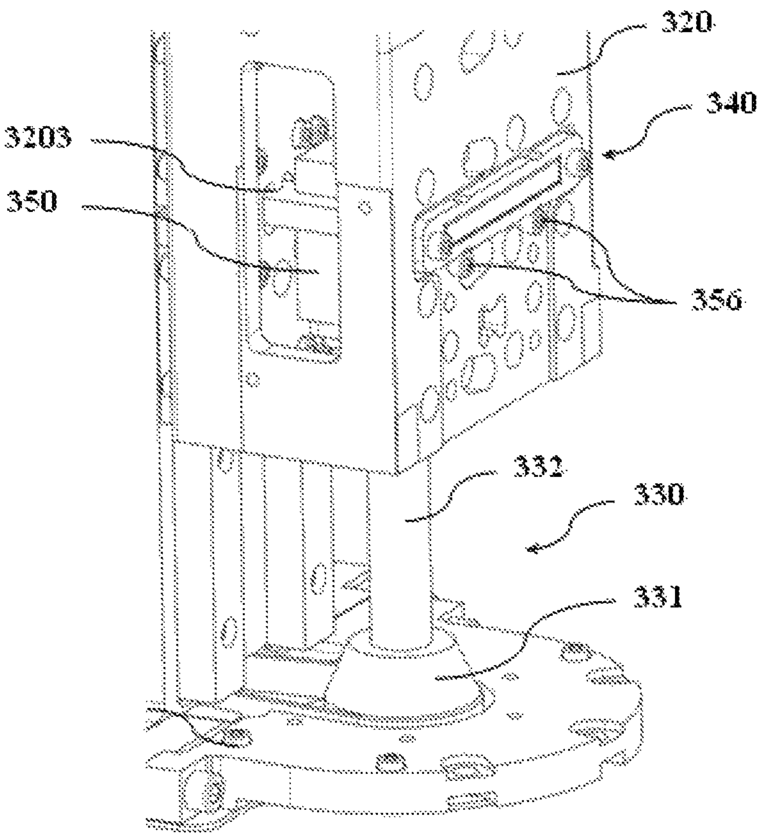
FIG. 20 illustrates details of the lifting device for use in an operating table in FIG. 19, wherein in the well-assembled state, the mating relations between the lifting fork and the top column, the nut housing are illustrated.
Figure 21:
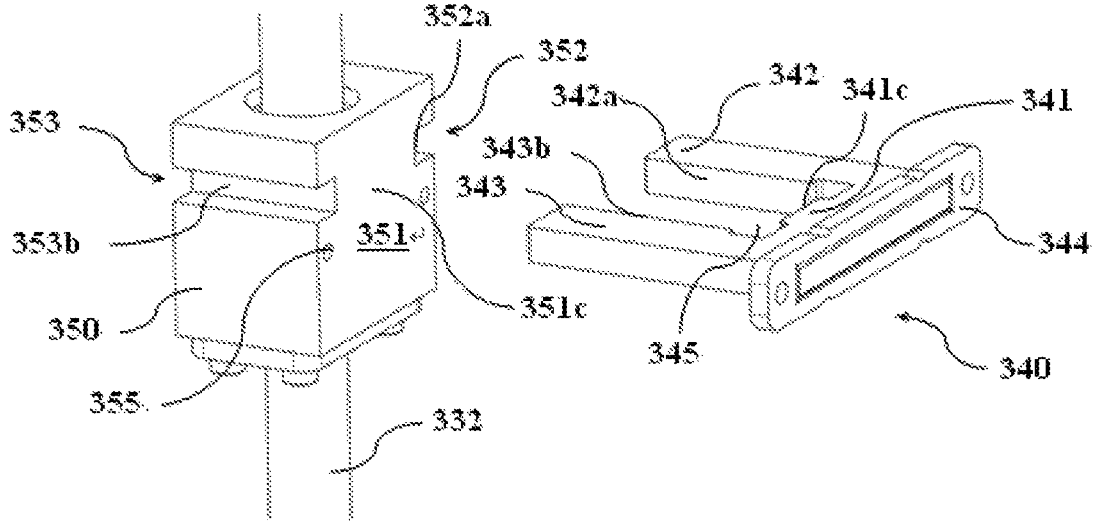
FIG. 21 is an exploded view of lifting fork and nut housing according to one embodiment of the present disclosure.
Figure 22:
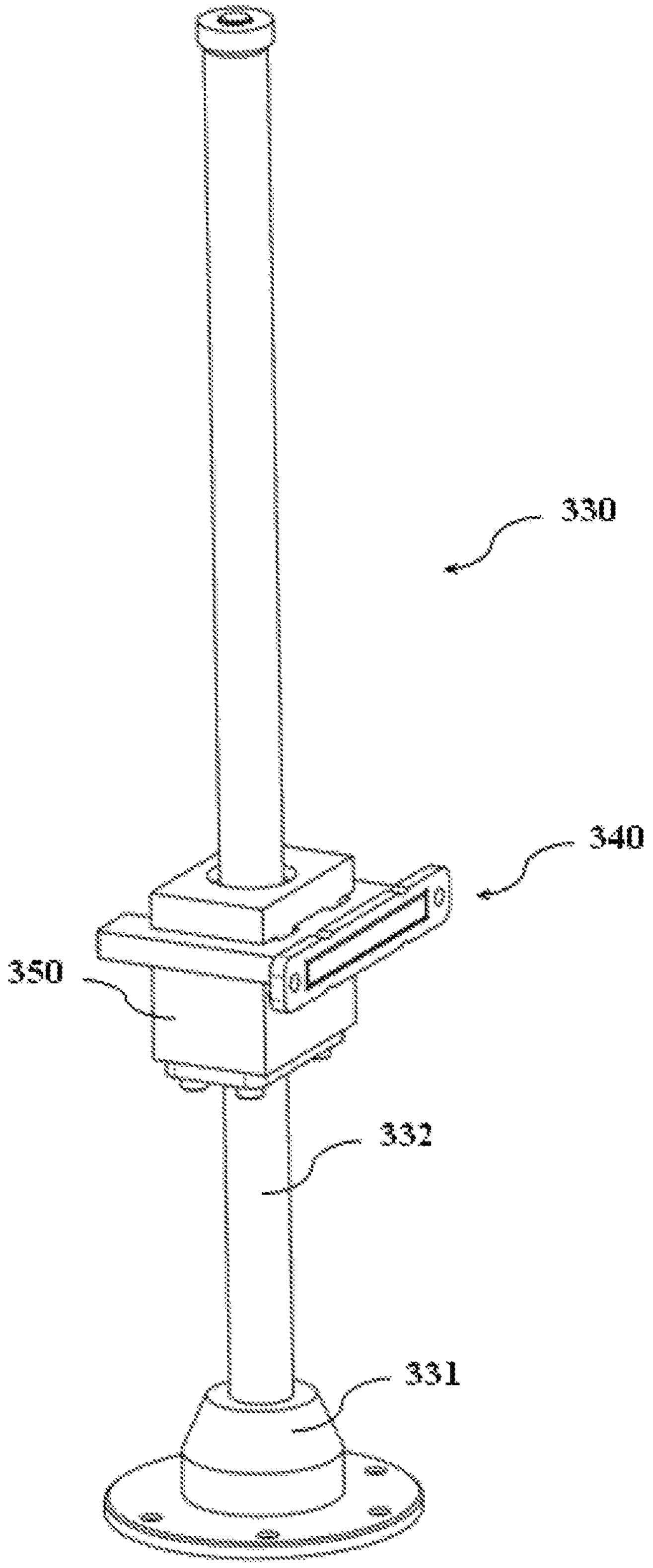
FIG. 22 illustrates mating relations between lifting fork and nut housing according to one embodiment of the present disclosure.

FIG. 21 is an exploded view of the lifting fork 340 and nut housing 350 according to one embodiment of the present disclosure, and FIG. 22 illustrates mating relations between lifting fork 340 and nut housing 350 according to one embodiment of the present disclosure. In the embodiment illustrated in FIG. 21, the nut housing 350 on both sides are respectively provided with a first groove 352 and a second groove 353 extending in a direction perpendicular to the lead screw 332, and further, the lifting fork 340 has a substantially U-shaped configuration. The lifting fork 340 has a base 341, a first arm 342 for being fit inserted into the first groove 352, and a second arm 343 for being fit inserted into the second groove 353, so that the base 341 and the first and second arms 342, 343 form a substantially U-shaped configuration. The inner side surface of the first arm 342 constitutes a first positioning surface 342*a* for abutting against a first abutment surface 352*a* of the first groove 352 of the nut housing 350 in the well-assembled state; the inner side surface of the second arm 343 constitutes a second positioning surface 343*b* for abutting against a second abutment surface 353*b* of the second groove 353 of the nut housing 350 in the well-assembled state; and the inner side surface of the base 341 constitutes a third positioning surface 341*c* for abutting against a third abutment surface 351*c* of the front side 351 of the nut housing 350 in the well-assembled state. Thereby, it is possible to achieve the particularly reliable positioning and fixation between the lifting fork 340 and the nut housing 350, and to avoid torsion of the nut housing in operation. As shown in FIG. 21, the lifting fork 340 at the outer side of the base 341 has a flange 344, by which the lifting fork 340 can be stopped against the outer side surface of the top column 320 and by which the lifting fork 340 is fixedly connected to the top column 320 (for example, fixedly connected to the top column 320 by passing the bolt through a through hole on the flange 344, referring to FIGS. 20 and 21). In one embodiment, notches 345 are respectively arranged at two corners of the inner side surface of the U-shaped lifting fork 340, so that the first positioning surface 342*a* and the third positioning surface 341*c* are spaced apart, and the second positioning surface 343*b* and the third positioning surface 341*c* are spaced apart. Thereby, it is possible to achieve the particularly excellent assembly and positioning and to avoid interference. In one embodiment, an adjustment bolt borehole 355, two adjustment bolt boreholes are disposed on the front side 351 of the nut housing 350. After the lifting fork 340 is inserted into the top column 320 and into the first and second grooves 352, 353 of the nut housing 350 for fixedly assembling, it is advantageous (see FIG. 20) that adjustment bolts 356 can be screwed into the adjustment bolt boreholes 355 of the nut housing 350 through the top column, so as to pretension the top column 320 and the nut housing 350 with a predetermined pretensioning force. Hereby, the particularly reliable and stable lifting capacity can be achieved.

FIG. 20 illustrates details of the lifting device 300 for use in an operating table in FIG. 19, wherein in the well-assembled state, the mating relations between the lifting fork 340 and the top column 320, the nut housing 350 are illustrated. In one embodiment illustrated by FIG. 20, the length of the first arm 342 and second arm 343 of the lifting fork 340 is greater than the length of the first groove 352 and second groove 353 of the nut housing 350. The width of the first arm 342 and second arm 343 of the lifting fork 340 is greater than the width of the first groove 352 and second groove 353 of the nut housing 350. As illustrated, the first arm 342 and the second arm 343 of the lifting fork 340 extend beyond the first groove 352 and the second groove 353, and are fitted into the corresponding openings at the rear side surface of the top column 320, wherein only opening 3203 is illustrated, and the rear side surface is the one opposite to the front side surface into which the lifting fork 340 is inserted. Thereby, the stable and reliable positioning connection can be achieved in a particularly simple structure, and it is possible to further avoid torsion of the nut housing.

It will be understood that the present disclosure is not limited to the above description. The various modifications and changes can be made to the present disclosure without departing from the spirit and range of the present disclosure.

Figure 23:
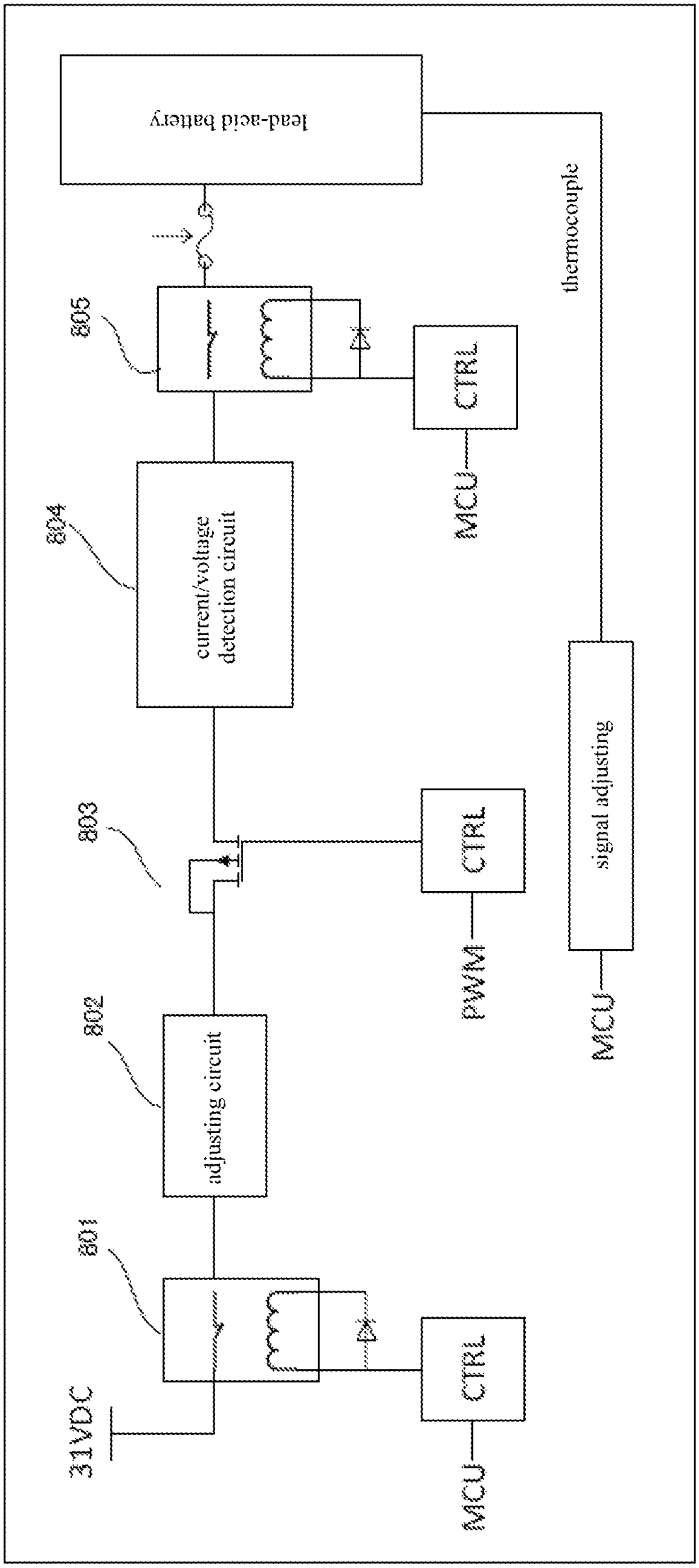
FIG. 23 is a structural view of charger according to one example of the present disclosure.

FIG. 23 is a structural view of the charger according to one example of the present disclosure. As illustrated, the charger comprises a charging power supply (such as DC power source of 31V in the illustrated example, i.e., 31 VDC), and a charging control circuit, wherein the charging power supply can charge the rechargeable battery through the charging control circuit. In this example of the present disclosure, lead-acid battery is exemplarily illustrated.

The charging control circuit comprises a first relay 801, an adjusting circuit 802, a controllable switch 803, a current/voltage detection circuit 804, a second relay 805 and fuse, wherein the detection circuit 804 is connected to the lead-acid battery to be charged through the second relay 805 and the fuse; the controllable switch 803 may be any device capable of achieving the switching function, such as Metal Oxide Semiconductor Field Effect Transistor (MOS), thyristor and the like, and hereinafter MOS transistor is exemplarily illustrated. According to the examples of the present disclosure, the charging control circuit further includes a microcontroller MCU and pulse-width modulator PWM. Here it will be noted that the circuit structural diagrams shown in the figures just are schematic, rather than indicating the actual connections.

As shown in the figures, MCU controls the on/off of the first relay 801 to switch on charging power supply 31 VDC so as to charge the lead-acid battery, wherein the adjusting circuit 802 is used for filtering electrical current outputted from the DC power source to filter out the unnecessary interference and ensure cleanness of the electrical current. The pulse-width modulator PWM is used for outputting a control signal of adjustable duty cycle and frequency to control conduction of the MOS transistor 803, thereby outputting charge current to the lead-acid battery through the second relay 805 and fuse according to the required mode for charging it. The current/voltage detection circuit 804 is used for detecting voltage of the lead-acid battery, and outputting the detection results to the PWM and MCU. PWM can adjust the output modes of the charging voltage and current according to the charging state of the lead-acid battery provided by the detection circuit 804. At the same time, MCU can control the relay 801 or 805 according to the battery state as detected by the detection circuit 804, for example, the relay is switched off in the case of abnormal situation to avoid the damage to the battery. In addition, as another embodiment of the present disclosure, MCU also can control PWM according to the charging state so as to output electrical current of a predetermined mode.

Further, the present disclosure may further include sensors for detecting the changes in physical conditions of the lead-acid battery, for example, a thermocouple may be used to sense temperature of the lead-acid battery. When the temperature collected by MCU is abnormal, a regulation signal is provided, which can control PWM to regulate the charge current mode so as to reduce the abnormally-changing trend of the temperature or directly switch off the relay 801 or 805 to avoid the damage to the battery.

Figure 24:
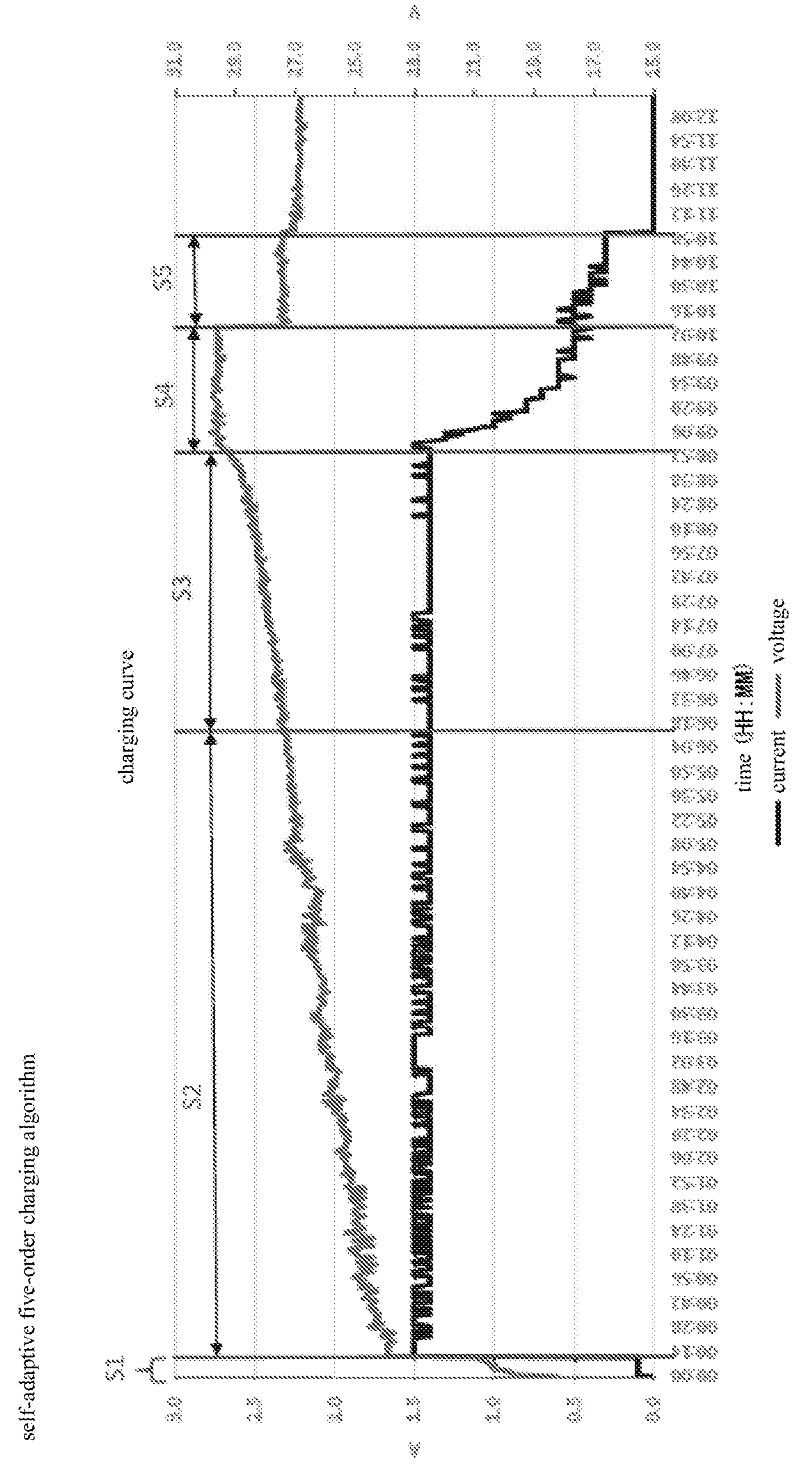
FIG. 24 illustrates charge current, voltage curves of five-order charging algorithm.

In one embodiment of the present disclosure, PWM can provide five-order charging algorithm so as to control the MOS transistor 803 to output five-mode charge current. As shown in FIG. 24, it illustrates the charging current, voltage curves of five-order charging algorithm, wherein the upper curve shows the current charging voltage of the lead-acid battery as detected, and the lower curve shows the electrical current for charging the battery, and the curves have five stages, i.e., S1, S2, S3, S4, S5.

At S1 stage, PWM outputs to the MOS transistor 803 a control signal $S_{control\text{-}1}$ of duty cycle and frequency at the first mode (also called as trickle mode), and this control signal $S_{control\text{-}1}$ causes the MOS transistor 803 to just output very little charge current, thereby causing the charging voltage of the battery to rise slowly. This stage is particularly suitable for the initial charging when depleting the battery level, since if the current is too great at this stage, it may damage the battery of chemical property like lead-acid battery.

At S2 stage, after the battery voltage rises to a certain degree such as 21.0 V as shown in the figure, PWM outputs to the MOS transistor 803 a control signal $S_{control\text{-}2}$ of duty cycle and frequency at the second mode (also called as large current mode), and this control signal $S_{control\text{-}2}$ causes the MOS transistor 803 to intensively output the nearly constant large charge current such as 1.5 A as shown so as to rapidly charge the battery, thereby causing the charge voltage of the battery to rise rapidly and close to the target charge voltage 27.4V of the battery.

Then, the charging process comes to S3 stage, that is, in order to achieve the better charging effect, PWM outputs to the MOS transistor 803 a control signal $S_{control\text{-}3}$ of duty cycle and frequency at the third mode (also called as overvoltage mode), and this control signal $S_{control\text{-}3}$ causes the MOS transistor 803 to reduce the frequencies for outputting the charge current, but charging is continued to supply the battery with charge voltage greater than the target charge voltage. At this stage use of overvoltage contributes to charging of a relatively larger amount of electric current into the battery. It comes to S4 stage after the overvoltage reaches a certain overvoltage amplitude threshold such as 29.4V.

At S4 stage, in order to achieve the better charging effect, PWM outputs to the MOS transistor 803 a control signal $S_{control\text{-}4}$ of duty cycle and frequency at the fourth mode (also called as voltage-constant mode), and this control signal $S_{control\text{-}4}$ causes the MOS transistor 803 to lower the level of outputting the charge current, but charging is continued while maintaining the above overvoltage amplitude threshold so as to fully charge the battery to the utmost extent.

At S5 stage, PWM outputs to the MOS transistor 803 a control signal $S_{control\text{-}5}$ of duty cycle and frequency at the fifth mode (also called as float mode), and this control signal $S_{control\text{-}5}$ causes the MOS transistor 803 to continuously lower the level of outputting the charge current until down to zero, and thereby correspondingly the voltage of the rechargeable battery will drop to the target voltage level from the overvoltage amplitude threshold. Finally, the whole charging process is completed.

Here it shall be noted that although the above example provides the five-order charging algorithm, the present disclosure is not limited to this when implementing it, and instead the corresponding stage can be matched to the battery adaptively. When the battery is connected to the charger of the present disclosure for charging it, at first the detection circuit 804 will run to detect the current voltage of the battery, to automatically select a proper charging mode for the battery. For example, when the charger is connected to the battery whose power capacity has been fully exhausted, the detected battery voltage is nearly close to zero in this case, and thus MCU can instruct PWM to output the control signal of the first mode according to the detection result, so as to charge the battery from the S1 stage. Another example, when the battery voltage detected by the detection circuit 804 is close to the target voltage, MCU can instruct PWM to output the control signal of the third mode according to the detection result, so as to charge the battery with overvoltage from the S3 stage. Thus, it can be seen that the solution of the present disclosure not only reduces the charging time, but also saves the energy.

In addition, the charger according to the example of the present disclosure may further include a memory (not shown), and MCU may store the stage information corresponding to the charging mode currently outputted from PWM into the memory. Thereby, if the charging process is interrupted and the charging is restored, MCU can read, from the memory, the pre-stored information of the stage when the interruption occurred, and instruct PWM to output the control signal corresponding to the stage when the interruption occurred so as to continue the charging. In this way, the charging time is saved, and the efficiency is promoted.

In addition, as can be seen from the five-order curve S1-S5, the present disclosure can regulate the charge cycle at each stage, so as to charge the battery in a more effective mode and simultaneously better protect the battery, thereby prolonging the service life of the battery. For example, in terms of a certain type of battery, if it is not suitable for the rapid charging, MCU can control PWM to output the control signal of desired duty cycle and frequency, so as to charge the battery in a more moderate mode. Further, providing an appropriate charge cycle for each stage can achieve the function of avoiding overcharging. For example, at S4 stage, when the preset charge cycle for this stage is ended, PWM will reduce and finally shut off the outputted charge current, to avoid damage to the battery.

As mentioned above, the present disclosure can control the charging process by employing the detection circuit 804 to feed back the charging state of the battery. Furthermore, it is possible to make use of the charging state for judging and processing the abnormity. For example, at S1 stage, if the detection circuit 804 detects that there is no obvious increase in the charging voltage after charging is made by a preset period of time (such as the preset charging period at S stage), MCU may preliminarily determine that the battery may be damaged and can not be used further, and thus interrupts the charging process and sends an alarm.

In another example of the present disclosure, the charger also can serve as a battery management system for facilitating management for the battery by the user. By using the detection circuit 804, sensors connected to the battery and the like arranged within the charger, the charger can obtain the current voltage, electrical current, working temperature, charging time and so on of the battery in real-time, and show the information to the user via a display, and send an alarm to the user when the temperature is too high or the capacity is too low, or make an analysis whether the battery is damaged according to the charging information and provide the same to the user for reference. In addition, when the fuse is blown due to the too large charge current or the charging control circuit is disconnected for other reasons, no charge current is detected at this moment, and the charger may send an alarm to the user.

It can be seen from the description for the above examples that the charger according to the present disclosure has the following advantages.

It is possible to set the flexible charging voltage and current by changing the frequency and duty cycle of the control signal as outputted from PWM.

The charger can charge the various rechargeable batteries, without the need of making a change to the hardware, and it is particularly suitable for the chemical batteries having the relatively high charging requirement, like lead-acid battery. As the charger of the present disclosure can provide the different charging voltages, it can meet the battery requirements for different voltages, manufacturers and performances.

The charger can regulate the charge current and voltage according to the temperature fluctuations so as to optimize the charging efficiency. For example, when the temperature is increased too rapidly, MCU may control PWM to reduce the output frequency and duration of the charge current or magnitude of current, and here such a choice of changing the current charging algorithm to a lower algorithm is possible, so as to reduce the charging speed for the battery and avoid the rapid increase in the temperature for damaging the battery.

As mentioned above, the charger according to the present disclosure can analyze the voltage situation of the battery, and thus it is possible to provide an appropriate algorithm matchable to the battery, so as to omit some unnecessary stages and improve the charging efficiency.

The charger can store the charging stage that was interrupted for some reasons during the previous charging process, and thus upon restoring the charging, the charger can start to the charging process from the interrupted charging stage, thereby saving the time.

Figure 25:
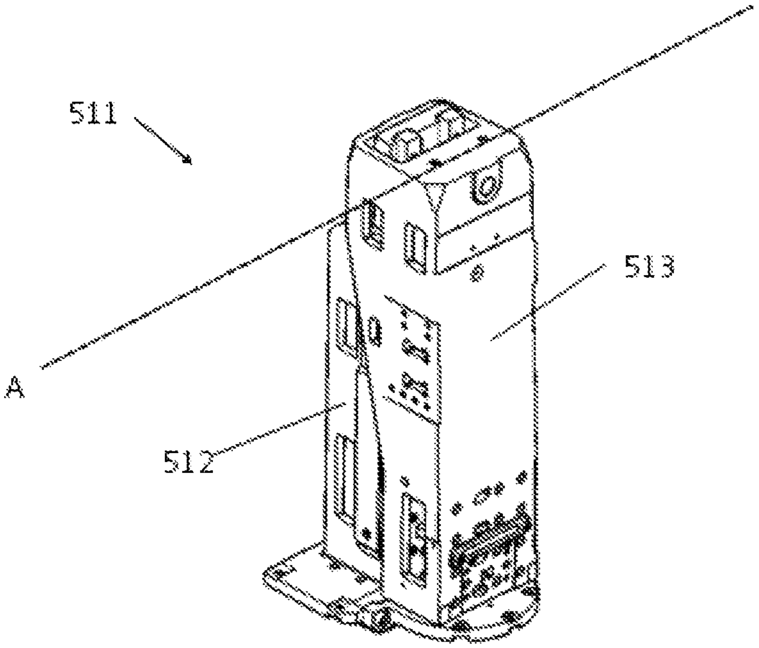
FIG. 25 illustrates a column guide system for supporting the operating table top according to the present disclosure, wherein the top column and the bottom column are assembled together.

FIG. 25 illustrates a column guide system 511 for supporting the operating table top according to the present disclosure. The column guide system 511 comprises a bottom column 512 and a top column 513, which are assembled together in FIG. 25. The bottom column 512 and top column 513 are generally in the form of rectangular cylinder respectively, and the longitudinal axis of the rectangular cylinder extends substantially in the vertical direction. Other cylindrical forms also may be considered, such as circular cylinder.

The bottom column 512 may be fixed, such as secured onto the ground of the operating room by bolts. The bottom column 512 also may have displacements members, such as rollers, for example, mounted on the bottom of the bottom column 512. The top column 513 can be driven by lifting mechanisms not shown so as to move in the vertical direction relative to the bottom column 512, such as being elevated or lowered. Thereby, the height of the operating table top can be regulated according to the surgical requirement. When the operating table top is at the lowest position, that is, the overall height of the column guide system 511 is smallest, the bottom column 512 extends into an opening at the top of the top column 513, so that the top side of the bottom column 512 is substantially flush with the top side of the top column 513. The structural relations between the bottom column 512 and the top column 513 will be further described hereinafter. FIG. 25 also illustrates a longitudinal axis A of the operating table top, and the extension direction of the longitudinal axis is substantially parallel to the height direction of the surgical object undergoing the surgery with a certain recumbent position.

Figure 26:
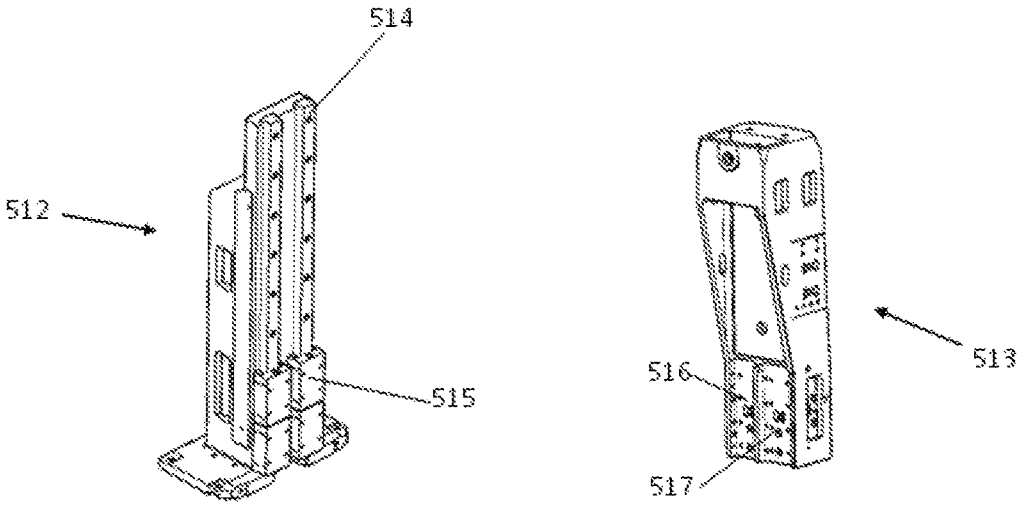
FIG. 26 illustrates a column guide system for supporting the operating table top according to the present disclosure, wherein the top column and the bottom column are individually shown.

In FIG. 26, the bottom column 512 and the top column 513 are individually shown.

As shown by the left one in FIG. 26, the bottom column 512 has two guide rails 514. The two guide rails 514 are arranged to be spaced apart from each other. The two guide rails 514 extends vertically along the whole height of the bottom column 512 substantially. The guide rails 514 can guide the top column 513 in the vertical direction, and hereby the top column 513 is movable relative to the bottom column 512 in the vertical direction in a guided manner. The guide rails 514 can be secured to the bottom column 512 by bolts. In the disclosed embodiment, the guide rails 514 are secured, by bolts, within slots that are drilled in the bottom column 512 and also extend vertically along the whole height of the bottom column 512 substantially. The width of the slots corresponds to the width of the guide rails 514. Thus, the sidewalls of the slots can additionally ensure that the guide rails 514 are fixed more firmly, so that the moment of flexion applied to the guide rails 514 can be transferred to the bottom column 512 via the sidewalls.

Here, the plane formed by the two guide rails 514 is parallel to the longitudinal axis A. Compared with such a column guide system where the plane formed by the two guide rails 514 is transverse to the longitudinal axis A, the column guide system 511 in FIG. 26 can provide the greater rigidity so as to bear the moment of flexion generated by the weight of the surgical object on the operating table. Further, the column guide system 511 has the smaller size as viewed from the side of the operating table, so as to provide the larger radiation-transmissive area for the operating table top and to allow for more spaces for executing the surgery. The bottom column 512 also may have more than two guide rails 514, such as three, four and so on. In a case where there are more than two guide rails 514, all the guide rails 514 are in the same plane that is parallel to the longitudinal axis A, so as to provide the improved guidance and greater rigidity.

As can be additionally seen, at the lower part of the guide rails 514, four guide sliders 515 are in pairs fitted on the two guide rails 514 in a positive-locking manner, respectively. In a case where the bottom column 512 and the top column 513 are assembled together (as shown in FIG. 25), the guide sliders 515 are secured on the top column 513.

The right one in FIG. 26 illustrates the top column 513, on which no guide sliders 515 are mounted. For clarity, a first slot 516 and a second slot 517 of the top column 513 are shown, which extend vertically and are used for mounting the guide sliders 515 therein. The first slot 516 and the second slot 517 are arranged in the bottom region of the top column 513, so that the adjustment can be made within the height range as large as possible. The first slot 516 and the second slot 517 may be formed in the top column 513 by cutting. The top column 513 has opposing sidewalls perpendicular to the longitudinal axis A, and the sidewalls have three sections from top to bottom. The first section has substantially the same width over the whole height of the first slot 516 and the second slot 517. The second section adjacent to the first section has a width that increases from bottom to top, so that the second section has an approximately trapezoid shape. The third section of the sidewall of the top column 513 extends to the top side of the top column 513 and has the substantially unchanged width over its whole height. The third sections of the two sidewalls are joined by the other sidewall at the end side facing the bottom column 512. Thus, the three sidewalls encircle the upper portion of the bottom column 512 in a U-like fashion. In this way, the rigidity of the column guide system 511 can be further improved.

Figure 27:
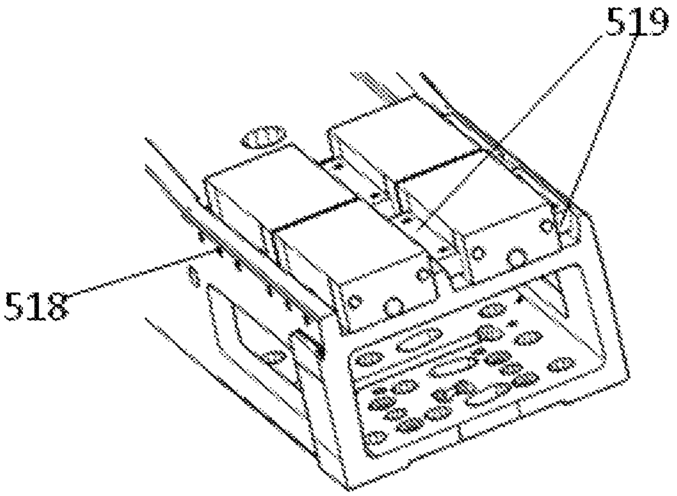
FIG. 27 illustrates parts of the top column equipped with guide sliders.

FIG. 27 illustrates mounting the guide sliders 515 within the first slot 516 and the second slot 517.

At the time of mounting the guide slider 515 within the first slot 516, at first one side of the guide slider 515 is placed to abut against one sidewall of the first slot 516, and then the guide slider 515 is fixed. The possible gap between the other side of the guide slider 515 and the other sidewall of the first slot 516 may be compensated by fastening screw 518 in a manner known to those skilled in the art. A wedge block 519 also may be used to compensate the gap, instead of the fastening screw 518.

Subsequently, the guide slider 515 is to be mounted in the second slot 517. Taking the one side of the guide slider 515 or the one sidewall of the first slot 516 as a reference plane, a spacing between one side of the guide slider 515 to be mounted in the second slot 517 and the reference plane or one sidewall of the second slot 517 is regulated by the wedge block 519, and the guide slider 515 is fixed in the second slot 517, so that after the top column 513 and the bottom column 512 are assembled, the guide slider 515 can be moved over the whole height of the guide rails 514 without being clamped. Finally, another wedge block 519 is used to compensate for the spacing between the other side of the guide slider 515 in the second slot 517 and the other sidewall of the second slot 517.

Use of the fastening screws 518 and wedge blocks 519 can ensure that the guide sliders 515 are position-fixedly mounted in the first slot 516 and the second slot 517, and thus the guide sliders 515 are fastened on the top column 513 in a positive-locking manner to a certain degree. Thereby, the bending moment applied to the top column 513 can be transferred to the bottom column 512 through the guide sliders 515 and the guide rails 513 that are positively-locking fitted with the guide sliders 515. At the same time, the guide sliders 515 can be guided over the entire height of the guide rails 513 without being clamped.

The column guide system according to the present disclosure can overcome the shortcomings in the prior art, and has the greater loading capability and compacter structure, thereby making it possible to regulate the height more stably without shaking. One skilled in the art also can arbitrarily combine the technical features of the present disclosure, without departing from the present disclosure.

Various combinations of elements of the present disclosure may be combined in differing permutations that represent patentable subject matter. For example, the elements disclosed herein may be arranged according to the following clauses:

Clause 1. A sealing device for an operating table, the operating table comprising a table top and a column having a column head (101), bellows (102) being mounted below the column head (101), characterized in that, a top surface (106) of the bellows (102) and a bottom surface (104) of the column head (101) are sealingly bonded, whereby the bellows (102) form a sealing device for the column head (101).

Clause 2. A sealing device according to clause 1, characterized in that, at least one cover (103) for covering the column head (101) from the outer side is attached to an upper frame (105) of the bellow (102), and is secured to the outer side surface of the column head (101).

Clause 3. A sealing device according to clause 2, characterized in that, the cover (103) covers a gap (110) between the column head (101) and the upper frame (105).

Clause 4. A sealing device for an operating table, the operating table comprising a table top, a table top support (113), and a column having a column head (101), characterized in that, the column head (101) is equipped with a holder (111) thereon, the holder (111) is drilled with a hole (116) for letting a cable (117) through and/or a window (124) for receiving a limit switch, so as to hold and guide the cable (117) into the column head (101) and/or bear the limit switch, and the sealing device is an adhesive (125) in the hole (116) and/or the window (124) for sealing the hole (116) and/or the window (124).

Clause 5. A sealing device according to clause 4, characterized in that, at least one part of the cable (117) is nested in an energy chain (112), one end of which energy chain (112) is attached to the table top support (113), and the other end of which is attached to the holder (111).

Clause 6. A sealing device for an operating table, the operating table comprising a table top and a column having a column head (101), the outer side of the column head (101) being at least regionally covered with a cover (132, 133) that defines a receiving window (134) for accommodating receiver (131), the receiver (131) being attached to the column head (101) within the receiving window (134), and a gasket (135) forming the sealing device being arranged between the receiver (131) and the column head (101), characterized in that, in a case where the receiver (131) is assembled, at least one edge of the gasket (135) sealingly abuts against the edge of the cover (132, 133) defining a border of the receiving window (134).

Clause 7. A sealing device according to clause 6, characterized in that, the cover (132, 133) is more than one in number, the receiving window (134) is delimited by at least two of the more than one covers, and at least one edge of the gasket (135) is pressed under at least one of the covers delimiting the receiving window (134).

Clause 8. A sealing device for an operating table, the operating table including a table top, a table top support (113) and a column having a column head (101), the table top support (113) being provided with a rack (141), the column head (101) being equipped thereon with a gear (142) engaging with the rack (141), characterized in that, the sealing device is a shield (143), and the shield (143) is sealingly attached to the column head (101) beneath the gear (142), so as to seal an opening where the interior space of the column head (101) is located relative to the gear (142).

Clause 9. A sealing device according to clause 8, characterized in that, above the gear (142) a depression (146) is arranged on the column head (101), a gear box (144) mechanically coupled to the gear (142) is received in the depression (146), a support plate (145) is attached to the column head (101) below the depression (146) so as to support the gear box (144) from below and retain the gear box (144) in the depression (146), the support plate (145) is provided with a notch (147) to receive at least one part of the gear (142), and the shield (143) is received within the notch (147) below the gear (142) so as to form a sealing engagement between the shield (143) and the support plate (145).

Clause 10. Control equipment (230) for an operating table, characterized by comprising:

at least one pair of relays (232A-232H), the respective output terminals of two relays in each pair of relay being receptively connected to both ends of one motor included in the operating table, the respective normally-closed terminals of the two relays being connected to a DC power source;

a driver (238), which is connected between ground and a normally-opened terminal of each relay of the at least one pair of relays, so as to work upon receiving a drive signal so that a normally-opened terminal of each relay of the at least one pair of relays is connected with the ground;

a microcontrol unit (W), which is used to output the drive signal to the driver in the case of being not disabled and to output a control signal to a control input end of the corresponding relay of the at least one pair of relays when a specified key on a keyboard is pressed down; and a control module (242) embodied by hardware for disabling the microcontrol unit when it is detected that a key of the keyboard indicating the emergency mode is pressed down, outputting the drive signal to the driver, and making the control input end of each relay of the at least one pair of relays connected to the corresponding key of the keyboard.

Clause 11. Control equipment according to clause 10, characterized in that, the control module is embodied by a complex programmable logic device.

Clause 12. Control equipment according to clause 10, characterized in that, the control module comprises:

a connection control circuit (250) for making the control input end of each relay of the at least one pair of relays connected to the corresponding key of the keyboard upon receiving a connection enable signal; and a detection circuit (248) for outputting the enable signal to the connection control circuit when it is detected that the key of the keyboard indicating the emergency mode is pressed down, outputting a disable signal to the microcontrol unit to disable the microcontrol unit, and outputting the drive signal to the driver.

Clause 13. Control equipment according to clause 10, characterized in that, the control module further comprises:

a connection control circuit (250) for making the control input end of each relay of the at least one pair of relays connected to the corresponding key of the keyboard upon receiving a connection enable signal;

a drive signal supply unit (252) for outputting the drive signal to the driver upon receiving an indication signal; and a detection circuit (248) for outputting the enable signal to the connection control circuit when it is detected that the key of the keyboard indicating the emergency mode is pressed down, outputting a disable signal to the microcontrol unit to disable the microcontrol unit, and outputting the indication signal to the drive signal supply unit.

Clause 14. Control equipment according to clause 12 or 13, characterized in that, the connection control circuit is an optical isolator.

Clause 15. Control equipment according to clause 13, characterized in that, the drive signal supply unit is a timer.

Clause 16. Control equipment according to clause 10, characterized by further comprising:

a keyboard.

Clause 17. Control equipment according to any one of clauses 10-14, characterized in that, the control module comprises plural pairs of terminals, each pair of terminals comprising an output terminal and an input terminal connected to one key of the keyboard, wherein, the control equipment further comprises a plurality of multiplexers (234A-234H), each of the multiplexers comprising at least two input terminals and one output terminal and two, and being used for connecting the input terminal of the two input terminals that is inputted with the signal to its output terminal, wherein for each multiplexer of the plurality of multiplexers, its output terminal is connected to the control input end of one relay of the at least one pair of relays, its input terminal is connected to the microcontrol unit to receive the control signal that is outputted by the microcontrol unit to the control input end of the one relay, and its other input terminal is connected to the output terminal included in one pair of the plural pairs of terminals, wherein, when it is detected that a key of the keyboard indicating the emergency mode is pressed down, the control module connects the input terminal and output terminal included in each pair of the plural pairs of terminals, so that the control input end of each relay of the at least one pair of relays is connected to the corresponding one key of the keyboard.

Clause 18. Control equipment according to clause 10, characterized in that, the keyboard is embodied by a device that directly outputs key signals, or a device capable of outputting digital signals.

Clause 19. An operating table (200), characterized by comprising: a table body (210) for bearing the patient undergoing the surgery;

at least one motor (220) for manipulating the table body; and control equipment (230) according to any one of clauses 10-18.

Clause 20. A lifting device (300) for use in an operating table, comprising:

a stationary bottom column (310);

a top column (320) movable in the vertical direction;

characterized in that, the lifting device (300) further comprises:

a lifting mechanism (330) for moving the top column (320) in the vertical direction, wherein the lifting mechanism (330) comprises a screw-and-nut transmission, which has a lead screw (332) that is in operative connection with a drive motor, and a screw nut that is accommodated within and is fixedly connected to a nut housing (350), and the screw-and-nut transmission is configured to convert a rotary motion of the lead screw (332) into a translational motion of the nut housing (350) in the vertical direction, wherein positioning and fastening of the top column (320) and the nut housing (350) are achieved by a lifting fork (340).

Clause 21. A lifting device (300) according to clause 20, characterized in that, the lifting fork (340) has a substantially U-shaped configuration.

Clause 22. A lifting device (300) according to clause 20 or 21, characterized in that, the nut housing (350) on both sides has a first groove (352) and a second groove (353) that extend in a direction perpendicular to the lead screw (332), respectively, and the lifting fork (340) has a base (341), a first arm (342) for being fit inserted into the first groove (352), and a second arm (343) for being fit inserted into the second groove (353).

Clause 23. A lifting device (300) according to clause 22, characterized in that, the inner side of the first arm (342) forms a first positioning surface (342*a*) and abuts against a first abutment surface (352*a*) of the first groove (352) in the well-assembled state, the inner side of the second arm (343) forms a second positioning surface (343*b*) and abuts against a second abutment surface (353*b*) of the second groove (353) in the well-assembled state, and the inner side of the base (341) forms a third positioning surface (341*c*) and abuts against a third abutment surface (351*c*) at the front side (351) of the nut housing (350) in the well-assembled state.

Clause 24. A lifting device (300) according to clause 23, characterized in that, notches (345) are respectively disposed at two corners of the inner side surface of the lifting fork (340), so that the first positioning surface (342*a*) and the third positioning surface (341*c*) are spaced apart, and the second positioning surface (343*b*) and the third positioning surface (341*c*) are spaced apart.

Clause 25. A lifting device (300) according to clause 20 or 21, characterized in that, the nut housing (350) at its front side (351) is provided with an adjustment bolt borehole (355), an adjustment bolt (356) in the well-assembled state being screwed into the adjustment bolt borehole (355) of the nut housing (350) through the top column (320) so as to pretension the top column (320) and the nut housing (350) with a predetermined pretensioning force.

Clause 26. A lifting device (300) according to clause 20 or 21, characterized in that, in the well-assembled state, the first arm (342) and the second arm (343) of the lifting fork (340) extend beyond the first groove (352) and the second groove (353) and are fitted in corresponding openings in the back side of the top column (320).

Clause 27. An operating table, characterized in that the operating table comprises an lifting device according to any one of clauses 20-26.

Clause 28. A charger, comprising a charging control circuit, characterized in that the charging control circuit further comprises:

a PWM circuit for controlling charge current for charging the battery to be charged by outputting a control signal of predetermined duty cycle and frequencies.

Clause 29. A charger according to clause 28, characterized in that, the charging control circuit further comprises:

a current/voltage detection circuit for detecting the state of the battery to be charged; and a microcontroller for controlling the duty cycle and frequencies of the control signal outputted from the PWM circuit according to the detected battery state.

Clause 30. A charger according to clause 29, characterized in that, the charging control circuit further comprises:

a temperature sensor for detecting a working temperature of the battery to be charged, wherein the microcontroller controls the duty cycle and frequencies of the control signal outputted from the PWM circuit according to the detected temperature.

Clause 31. A charger according to any one of clauses 28-30, characterized in that, there are plural groups of the control signals, wherein the duty cycles and frequencies of the groups of the control signals each are different from each other, so as to control the magnitude and duration of the different charge currents.

Clause 32. A column guide system (511) for supporting a table top of an operating table, the column guide system (511) comprising a bottom column (512) and a top column (513), the bottom column (512) having at least two guide rails (514) that are arranged to be spaced apart from each other, the top column (513) being guided in the vertical direction by the guide rails (514), characterized in that, the guide rails (514) are arranged to make the plane formed by the guide rail parallel to the longitudinal axis (A) of the operating table top.

Clause 33. A column guide system (511) according to clause 32, characterized in that, the top column (513) in its lower region has at least two guide sliders (515) and a spacing adjustment compensation device, the guide sliders (515) can be fitted onto the guide rails (514) in a positive-locking manner, and the spacing adjustment compensation device is used to adjust a spacing between the guide sliders (515) so as to enable the guide sliders (515) to move over the entire height of the guide rails (514).

Clause 34. A column guide system (511) according to clause 33, characterized in that, the spacing adjustment compensation device at least includes a first slot (516) and a second slot (517) and spacing adjustment compensation elements, the guide sliders (515) are respectively secured within the corresponding slots, and the spacing adjustment compensation elements are configured to adjust the spacing between the side of the guide sliders (515) and the sidewall of the slots.

Clause 35. A column guide system (511) according to clause 34, characterized in that, one side of the guide slider (515) within the first slot (516) abuts against one sidewall of the first slot (516), and the spacing between the other side thereof and the other sidewall of the first slot (516) is regulated by the spacing adjustment compensation elements.

Clause 36. A column guide system (511) according to clause 35, characterized in that, the spacing adjustment compensation element is a fastening screw (518) or wedge block.

Clause 37. A column guide system (511) according to clause 34, characterized in that, in terms of the two sides of the guide slider (515) in the second slot (517), the spacing between the said sides and the corresponding sidewalls of the second slot (517) is regulated by the spacing adjustment compensation element.

Clause 38. A column guide system (511) according to clause 37, characterized in that, the spacing adjustment compensation element is a wedge block (519).

Clause 39. An operating table, characterized in that the operating table has a column guide system (511) according to any one of clauses 32-38.

Clause 40. The operating table (200) of clauses 19, further comprising:

a sealing device according to any one of clauses 1-9.

Clause 41. The operating table (200) of either of clauses 19 or 40, further comprising:

a lifting device (300) of any of clauses 20-26.

Clause 42. The operating table (200) of any of clauses 19, 40, or 41, further comprising:

a charger according to any of clauses 28-31.

Clause 43. The operating table (200) of any of clauses 19, 40, 41 or 42, further comprising:

a column guide system (511) according to any of claims 32-38.

The invention claimed is:

1. A lifting device for use in an operating table, comprising:

a stationary bottom column;

a top column movable in the vertical direction;

wherein the lifting device further comprises:

a lifting mechanism for moving the top column in the vertical direction, wherein the lifting mechanism comprises a screw-and-nut transmission, which has a lead screw that is in operative connection with a drive motor, and a screw nut that is accommodated within and is fixedly connected to a nut housing, and the screw-and-nut transmission is configured to convert a rotary motion of the lead screw into a translational motion of the nut housing in the vertical direction, and wherein positioning and fastening of the top column and the nut housing are achieved by a lifting fork, wherein the nut housing on both sides has a first groove and a second groove that extend in a direction perpendicular to the lead screw, respectively, and the lifting fork has a base, a first arm for being fit inserted into the first groove, and a second arm for being fit inserted into the second groove.

2. A lifting device of claim 1, wherein the lifting fork has a substantially U-shaped configuration.

3. A lifting device of claim 2, wherein the front side of the nut housing is provided with an adjustment bolt borehole, an adjustment bolt in the well-assembled state being screwed into the adjustment bolt borehole of the nut housing through the top column so as to pretension the top column and the nut housing with a predetermined pretensioning force.

4. A lifting device of claim 2, wherein in the well-assembled state, the first arm and the second arm of the lifting fork extend beyond the first groove and the second groove and are fitted in corresponding openings in the back side of the top column.

5. A lifting device of claim 1, wherein the front side of the nut housing is provided with an adjustment bolt borehole, an adjustment bolt in the well-assembled state being screwed into the adjustment bolt borehole of the nut housing through the top column so as to pretension the top column and the nut housing with a predetermined pretensioning force.

6. A lifting device of claim 1, wherein in the well-assembled state, the first arm and the second arm of the lifting fork extend beyond the first groove and the second groove and are fitted in corresponding openings in the back side of the top column.

7. A lifting device of claim 4, wherein the inner side of the first arm forms a first positioning surface and abuts against a first abutment surface of the first groove in the well-assembled state, the inner side of the second arm forms a second positioning surface and abuts against a second abutment surface of the second groove in the well-assembled state, and the inner side of the base forms a third positioning surface and abuts against a third abutment surface at the front side of the nut housing in the well-assembled state.

8. A lifting device of claim 7, wherein respective notches are formed at two corners of the inner side surface of the lifting fork, so that the first positioning surface and the third positioning surface are spaced apart, and the second positioning surface and the third positioning surface are spaced apart.

9. A lifting device of claim 1, wherein the inner side of the first arm forms a first positioning surface and abuts against a first abutment surface of the first groove in the well-assembled state, the inner side of the second arm forms a second positioning surface and abuts against a second abutment surface of the second groove in the well-assembled state, and the inner side of the base forms a third positioning surface and abuts against a third abutment surface at the front side of the nut housing in the well-assembled state.

10. A lifting device of claim 9, wherein respective notches are formed at two corners of the inner side surface of the lifting fork, so that the first positioning surface and the third positioning surface are spaced apart, and the second positioning surface and the third positioning surface are spaced apart.

11. An operating table comprising a lifting device, the lifting device comprising:

a stationary bottom column;

a top column movable in the vertical direction;

wherein the lifting device further comprises:

a lifting mechanism for moving the top column in the vertical direction, wherein the lifting mechanism comprises a screw-and-nut transmission, which has a lead screw that is in operative connection with a drive motor, and a screw nut that is accommodated within and is fixedly connected to a nut housing, and the screw-and-nut transmission is configured to convert a rotary motion of the lead screw into a translational motion of the nut housing in the vertical direction, and wherein positioning and fastening of the top column and the nut housing are achieved by a lifting fork, wherein the nut housing on both sides has a first groove and a second groove that extend in a direction perpendicular to the lead screw, respectively, and the lifting fork has a base, a first arm for being fit inserted into the first groove, and a second arm for being fit inserted into the second groove.

12. An operating table of claim 11, wherein the lifting fork has a substantially U-shaped configuration.

13. An operating table of claim 11, wherein the front side of the nut housing is provided with an adjustment bolt borehole, an adjustment bolt in the well-assembled state being screwed into the adjustment bolt borehole of the nut housing through the top column so as to pretension the top column and the nut housing with a predetermined pretensioning force.

14. An operating table of claim 13, wherein in the well-assembled state, the first arm and the second arm of the lifting fork extend beyond the first groove and the second groove and are fitted in corresponding openings in the back side of the top column.

15. An operating table of claim 13, wherein the inner side of the first arm forms a first positioning surface and abuts against a first abutment surface of the first groove in the well-assembled state, the inner side of the second arm forms a second positioning surface and abuts against a second abutment surface of the second groove in the well-assembled state, and the inner side of the base forms a third positioning surface and abuts against a third abutment surface at the front side of the nut housing in the well-assembled state.

16. An operating table of claim 15, wherein respective notches are formed at two corners of the inner side surface of the lifting fork, so that the first positioning surface and the third positioning surface are spaced apart, and the second positioning surface and the third positioning surface are spaced apart.

17. An operating table of claim 11, wherein in the well-assembled state, the first arm and the second arm of the lifting fork extend beyond the first groove and the second groove and are fitted in corresponding openings in the back side of the top column.

18. An operating table of claim 11, wherein the inner side of the first arm forms a first positioning surface and abuts against a first abutment surface of the first groove in the well-assembled state, the inner side of the second arm forms a second positioning surface and abuts against a second abutment surface of the second groove in the well-assembled state, and the inner side of the base forms a third positioning surface and abuts against a third abutment surface at the front side of the nut housing in the well-assembled state.

19. An operating table of claim 18, wherein respective notches are formed at two corners of the inner side surface of the lifting fork, so that the first positioning surface and the third positioning surface are spaced apart, and the second positioning surface and the third positioning surface are spaced apart.

* * * * *